US011202483B2

(12) United States Patent
Bruce et al.

(10) Patent No.: US 11,202,483 B2
(45) Date of Patent: Dec. 21, 2021

(54) BRAIDED ARTICLES AND METHODS FOR THEIR MANUFACTURE

(71) Applicant: NIKE, Inc., Beaverton, OR (US)

(72) Inventors: Robert M. Bruce, Portland, OR (US); Eun Kyung Lee, Beaverton, OR (US); James Y. Yoo, Portland, OR (US); Chikao Ichikawa, Gunma (JP)

(73) Assignee: NIKE, INC., Beaverton, OR (US)

( * ) Notice: Subject to any disclaimer, the term of this patent is extended or adjusted under 35 U.S.C. 154(b) by 69 days.

(21) Appl. No.: 15/993,190

(22) Filed: May 30, 2018

(65) Prior Publication Data

US 2018/0368506 A1 Dec. 27, 2018

Related U.S. Application Data

(60) Provisional application No. 62/512,898, filed on May 31, 2017.

(51) Int. Cl.
*A43B 1/04* (2006.01)
*A43B 23/04* (2006.01)
(Continued)

(52) U.S. Cl.
CPC ............ *A43B 1/04* (2013.01); *A43B 23/0205* (2013.01); *A43B 23/0245* (2013.01);
(Continued)

(58) Field of Classification Search
CPC ....... A43B 1/04; D04C 1/06; D10B 2501/043
See application file for complete search history.

(56) References Cited

U.S. PATENT DOCUMENTS

| 165,941 A | 7/1875 | Malhere |
| 329,739 A | 11/1885 | Henkels |

(Continued)

FOREIGN PATENT DOCUMENTS

| BE | 426458 A | 3/1938 |
| CN | 86209002 U | 10/1987 |

(Continued)

OTHER PUBLICATIONS

Non-Final Office Action received for U.S. Appl. No. 15/993,180, dated Apr. 6, 2020, 13 pages.

(Continued)

*Primary Examiner* — Shaun R Hurley
*Assistant Examiner* — Bao-Thieu L Nguyen
(74) *Attorney, Agent, or Firm* — Shook, Hardy and Bacon L.L.P.

(57) ABSTRACT

Aspects herein are directed to braided articles and methods for their manufacture. The braided articles may include articles of footwear having braided uppers. The braided uppers may include a base yarn and a high performance yarn. The high performance yarn may form a braided structure within the braided upper. The braided structure may be continuously braided to provide continuous support to a wearer's foot when the article of footwear is worn as intended, by a wearer. Additionally, the high performance yarn may be configured to exit the braided upper and re-enter the braided upper to form a plurality of arcuate loops along the throat area of the braided article of footwear for accommodating a lace for further adjustment of the fit of the article of footwear on the wearer's foot, when worn.

18 Claims, 14 Drawing Sheets

(51) Int. Cl.
   *D04C 1/06* (2006.01)
   *A43B 23/02* (2006.01)
   *A43D 3/02* (2006.01)
   *A43B 7/14* (2006.01)
   *B29D 35/12* (2010.01)

(52) U.S. Cl.
   CPC ............ *A43B 23/042* (2013.01); *A43D 3/022* (2013.01); *B29D 35/122* (2013.01); *B29D 35/124* (2013.01); *B29D 35/126* (2013.01); *D04C 1/06* (2013.01); *A43B 7/1495* (2013.01); *D10B 2501/043* (2013.01)

(56) References Cited

U.S. PATENT DOCUMENTS

| | | |
|---|---|---|
| 376,372 A | 1/1888 | Dodge et al. |
| 509,241 A | 11/1893 | Packard |
| 586,137 A | 7/1897 | Medger |
| 621,922 A | 3/1899 | Kelsall |
| 972,718 A | 10/1910 | Rahm |
| 1,182,325 A | 5/1916 | Sedmak |
| 1,318,888 A | 10/1919 | Le Carpentier |
| 1,527,344 A | 2/1925 | Bente et al. |
| 1,538,160 A | 5/1925 | Bosebeck |
| 1,540,903 A | 6/1925 | Santoyo |
| 1,554,325 A | 9/1925 | Bente |
| 1,583,273 A | 5/1926 | Bosebeck |
| 1,597,934 A | 8/1926 | Stimpson |
| 1,600,621 A | 9/1926 | Buek, Jr. |
| 1,622,021 A | 3/1927 | Birkin et al. |
| 1,637,716 A | 8/1927 | Turck |
| 1,663,319 A | 3/1928 | Snell |
| 1,687,643 A | 10/1928 | Berliner |
| 1,713,307 A | 5/1929 | Stritter |
| 1,717,183 A | 6/1929 | Brenner |
| 1,730,768 A * | 10/1929 | Heyman ............... A43B 23/02 87/8 |
| 1,803,554 A | 5/1931 | Knilans |
| 1,828,320 A | 10/1931 | Daniels |
| 1,832,691 A | 11/1931 | David |
| 1,864,254 A | 6/1932 | Meyer |
| 1,877,080 A | 9/1932 | Teshima |
| 1,887,643 A | 11/1932 | Huber |
| 1,949,318 A | 2/1934 | Markowsky |
| D91,999 S | 4/1934 | Heilbrunn |
| 2,001,293 A | 5/1935 | Wilson |
| 2,022,350 A | 11/1935 | Huber |
| 2,091,215 A | 8/1937 | Price |
| 2,144,689 A | 1/1939 | Roberts |
| 2,147,197 A | 2/1939 | Glidden |
| 2,161,472 A | 6/1939 | Hurwit |
| 2,162,472 A | 6/1939 | Scharf |
| 2,165,092 A | 7/1939 | Daniels |
| 2,188,640 A | 1/1940 | Bloch et al. |
| RE21,392 E | 3/1940 | Hurwit |
| 2,271,888 A | 2/1942 | Manley |
| 2,311,959 A | 2/1943 | Nurk |
| D137,767 S | 4/1944 | Goldstein |
| 2,382,559 A | 8/1945 | Goldstein |
| 2,412,808 A | 12/1946 | Goldstein |
| 2,521,072 A | 9/1950 | Lovell |
| D164,847 S | 10/1951 | Dronoff |
| 2,586,045 A | 2/1952 | Hoza |
| 2,617,129 A | 11/1952 | Petze |
| 2,641,004 A | 6/1953 | Whiting et al. |
| 2,675,631 A | 4/1954 | Doughty |
| 2,679,117 A | 5/1954 | Reed |
| 2,701,887 A | 2/1955 | Nolan |
| 2,936,670 A | 5/1960 | Walter |
| 3,052,904 A | 9/1962 | Reid et al. |
| 3,081,368 A | 3/1963 | Wunsche |
| 3,257,677 A | 6/1966 | Batchelder et al. |
| 3,282,757 A | 11/1966 | Brussee |
| 3,397,847 A | 8/1968 | Thaden |
| 3,474,478 A | 10/1969 | Rubico et al. |
| 3,504,450 A | 4/1970 | Steadman et al. |
| 3,525,110 A | 8/1970 | Rubico et al. |
| 3,586,058 A | 6/1971 | Ahrens et al. |
| 3,619,838 A | 11/1971 | Winkler |
| 3,714,862 A | 2/1973 | Berger |
| 3,745,600 A | 7/1973 | Rubico et al. |
| 3,805,667 A | 4/1974 | Orser |
| 3,821,827 A | 7/1974 | Nadler |
| 3,866,512 A | 2/1975 | Berger |
| 4,134,955 A | 1/1979 | Hanrahan, Jr. et al. |
| 4,149,249 A | 4/1979 | Pavkovich |
| 4,222,183 A | 9/1980 | Haddox |
| 4,232,458 A | 11/1980 | Bartels |
| 4,275,638 A | 6/1981 | DeYoung |
| 4,341,097 A | 7/1982 | Cassidy et al. |
| 4,351,889 A | 9/1982 | Sundberg |
| 4,394,803 A | 7/1983 | Goldstein |
| 4,430,811 A | 2/1984 | Okada |
| 4,447,967 A | 5/1984 | Zaino |
| 4,519,290 A | 5/1985 | Inman et al. |
| 4,587,749 A | 5/1986 | Berlese |
| 4,591,155 A | 5/1986 | Adachi |
| 4,629,650 A | 12/1986 | Kataoka |
| 4,640,027 A | 2/1987 | Berlese |
| 4,662,088 A | 5/1987 | Autry et al. |
| 4,719,837 A | 1/1988 | McConnell et al. |
| 4,785,558 A | 11/1988 | Shiomura |
| 4,800,796 A | 1/1989 | Vendramini |
| 4,847,063 A | 7/1989 | Smith |
| 4,848,745 A | 7/1989 | Bohannan et al. |
| 4,857,124 A | 8/1989 | Shobert et al. |
| 4,879,778 A | 11/1989 | Becka et al. |
| 4,882,858 A | 11/1989 | Signori |
| 4,885,973 A | 12/1989 | Spain |
| 4,916,997 A | 4/1990 | Spain |
| 4,919,388 A | 4/1990 | Koike et al. |
| 4,939,805 A | 7/1990 | Walega |
| 4,974,275 A | 12/1990 | Backes et al. |
| 4,976,812 A | 12/1990 | McConnell et al. |
| 4,992,313 A | 2/1991 | Shobert et al. |
| 5,001,961 A | 3/1991 | Spain |
| D315,823 S | 4/1991 | Signori |
| 5,067,525 A | 11/1991 | Tsuzuki et al. |
| 5,121,329 A | 6/1992 | Crump |
| 5,201,952 A | 4/1993 | Yahagi et al. |
| 5,203,249 A | 4/1993 | Adams et al. |
| 5,257,571 A | 11/1993 | Richardson |
| 5,287,790 A | 2/1994 | Akiyama et al. |
| 5,335,517 A | 8/1994 | Throneburg et al. |
| 5,344,315 A | 9/1994 | Hanson |
| 5,345,638 A | 9/1994 | Nishida |
| 5,348,056 A | 9/1994 | Tsuzuki |
| 5,361,674 A | 11/1994 | Akiyama et al. |
| 5,381,610 A | 1/1995 | Hanson |
| 5,385,077 A | 1/1995 | Akiyama et al. |
| 5,388,497 A | 2/1995 | Akiyama et al. |
| 5,396,829 A | 3/1995 | Akiyama et al. |
| 5,398,586 A | 3/1995 | Akiyama et al. |
| 5,439,215 A | 8/1995 | Ratchford |
| 5,476,027 A | 12/1995 | Uchida et al. |
| 5,647,150 A | 7/1997 | Romanato et al. |
| 5,732,413 A | 3/1998 | Williams |
| 5,792,093 A | 8/1998 | Tanaka |
| 5,885,622 A | 3/1999 | Daley |
| 5,896,758 A | 4/1999 | Rock et al. |
| 5,901,632 A | 5/1999 | Ryan |
| 6,024,005 A | 2/2000 | Uozumi |
| 6,029,376 A | 2/2000 | Cass |
| 6,205,683 B1 | 3/2001 | Clark et al. |
| 6,298,582 B1 | 10/2001 | Friton et al. |
| 6,308,536 B2 | 10/2001 | Roell |
| 6,345,598 B1 | 2/2002 | Bogdanovich et al. |
| 6,401,364 B1 | 6/2002 | Burt |
| 6,451,046 B1 | 9/2002 | Leo et al. |
| 6,482,492 B1 | 11/2002 | Hung |
| 6,510,961 B1 | 1/2003 | Head et al. |
| 6,588,237 B2 | 7/2003 | Cole et al. |
| 6,679,152 B1 | 1/2004 | Head et al. |

(56) References Cited

U.S. PATENT DOCUMENTS

| | | |
|---|---|---|
| 6,696,001 B1 | 2/2004 | Quddus |
| 6,826,853 B1 | 12/2004 | Zanatta |
| 6,910,288 B2 | 6/2005 | Dua |
| 6,931,762 B1 | 8/2005 | Dua |
| 6,945,153 B2 | 9/2005 | Knudsen et al. |
| 6,971,252 B2 | 12/2005 | Therin et al. |
| 7,004,967 B2 | 2/2006 | Chouinard et al. |
| 7,047,668 B2 | 5/2006 | Burris et al. |
| 7,093,527 B2 | 8/2006 | Rapaport et al. |
| 7,168,951 B2 | 1/2007 | Fischer et al. |
| 7,204,903 B2 | 4/2007 | Yasui |
| 7,228,777 B2 | 6/2007 | Morissette et al. |
| 7,252,028 B2 | 8/2007 | Bechtold et al. |
| 7,262,353 B2 | 8/2007 | Bartholomew et al. |
| 7,275,471 B2 | 10/2007 | Nishri et al. |
| 7,293,371 B2 * | 11/2007 | Aveni .................. A43B 7/08 36/45 |
| 7,300,014 B2 | 11/2007 | Allen |
| 7,347,011 B2 | 3/2008 | Dua et al. |
| D578,294 S | 10/2008 | Mervar et al. |
| 7,430,818 B2 | 10/2008 | Valat et al. |
| 7,444,916 B2 | 11/2008 | Hirukawa |
| 7,549,185 B2 | 6/2009 | Yang |
| 7,566,376 B2 | 7/2009 | Matsuoka |
| 7,703,218 B2 | 4/2010 | Burgess |
| 7,703,220 B2 * | 4/2010 | Aveni .................. A43B 7/08 36/45 |
| 7,793,434 B2 | 9/2010 | Sokolowski et al. |
| 7,793,576 B2 | 9/2010 | Head et al. |
| 7,815,141 B2 | 10/2010 | Uozumi et al. |
| 7,836,608 B2 | 11/2010 | Greene |
| 7,870,681 B2 | 1/2011 | Meschter |
| 7,908,956 B2 | 3/2011 | Dow et al. |
| 7,913,426 B2 | 3/2011 | Valat et al. |
| 7,938,853 B2 | 5/2011 | Chouinard et al. |
| 7,941,942 B2 | 5/2011 | Hooper et al. |
| 7,963,747 B2 | 6/2011 | Cairo |
| 8,006,601 B2 | 8/2011 | Inazawa et al. |
| 8,051,585 B2 | 11/2011 | Hope et al. |
| 8,056,173 B2 | 11/2011 | RongBo |
| 8,061,253 B2 | 11/2011 | Wybrow |
| 8,210,086 B2 | 7/2012 | Head et al. |
| 8,261,648 B1 | 9/2012 | Marchand et al. |
| 8,266,827 B2 | 9/2012 | Dojan et al. |
| 8,312,645 B2 | 11/2012 | Dojan et al. |
| 8,312,646 B2 | 11/2012 | Meschter et al. |
| 8,388,791 B2 | 3/2013 | Dojan et al. |
| 8,394,222 B2 | 3/2013 | Rettig |
| 8,438,757 B2 | 5/2013 | Roser |
| 8,511,214 B2 | 8/2013 | Gries |
| 8,544,191 B2 | 10/2013 | Marvin et al. |
| 8,544,197 B2 | 10/2013 | Spanks et al. |
| 8,544,199 B1 | 10/2013 | Pentland |
| 8,578,534 B2 | 11/2013 | Langvin et al. |
| 8,578,632 B2 | 11/2013 | Bell et al. |
| 8,651,007 B2 | 2/2014 | Adams |
| 8,690,962 B2 | 4/2014 | Dignam et al. |
| 8,757,038 B2 | 6/2014 | Siegismund |
| 8,770,081 B2 | 7/2014 | David et al. |
| 8,789,295 B2 | 7/2014 | Burch et al. |
| 8,789,452 B1 | 7/2014 | Janardhan et al. |
| 8,794,118 B2 | 8/2014 | Dow et al. |
| 8,819,963 B2 | 9/2014 | Dojan et al. |
| 8,959,959 B1 | 2/2015 | Podhajny |
| 8,984,776 B2 | 3/2015 | Ludemann et al. |
| 8,997,529 B1 | 4/2015 | Podhajny |
| D737,561 S | 9/2015 | Aveni et al. |
| 9,179,739 B2 | 11/2015 | Al. |
| D786,590 S | 5/2017 | Cook |
| 9,668,544 B2 | 6/2017 | Bruce et al. |
| 9,681,708 B2 | 6/2017 | Greene et al. |
| 9,723,895 B2 | 8/2017 | Schaefer et al. |
| 9,756,901 B2 | 9/2017 | Musho et al. |
| D798,565 S | 10/2017 | Aveni et al. |
| 9,839,253 B2 | 12/2017 | Bruce et al. |
| 10,159,297 B2 | 12/2018 | Jamison |
| 10,238,176 B2 | 3/2019 | Bruce et al. |
| 10,280,538 B2 | 5/2019 | Bruce et al. |
| 10,299,544 B2 | 5/2019 | Bruce et al. |
| 10,631,594 B2 | 4/2020 | Boucher et al. |
| 10,709,204 B2 | 7/2020 | Iuchi et al. |
| 10,952,490 B2 | 3/2021 | Bruce et al. |
| 2001/0007180 A1 | 7/2001 | Bordin et al. |
| 2003/0000111 A1 | 1/2003 | Basso |
| 2003/0213547 A1 | 11/2003 | Ono et al. |
| 2004/0118018 A1 | 6/2004 | Dua |
| 2004/0244412 A1 | 12/2004 | Trinh et al. |
| 2005/0076536 A1 | 4/2005 | Hatfield et al. |
| 2005/0081402 A1 | 4/2005 | Orei et al. |
| 2005/0115284 A1 | 6/2005 | Dua |
| 2005/0178026 A1 | 8/2005 | Friton |
| 2005/0193592 A1 | 9/2005 | Dua et al. |
| 2005/0208860 A1 | 9/2005 | Baron et al. |
| 2005/0284002 A1 | 12/2005 | Aveni |
| 2006/0048413 A1 | 3/2006 | Sokolowski et al. |
| 2006/0059715 A1 | 3/2006 | Aveni |
| 2006/0162190 A1 | 7/2006 | Nishiwaki et al. |
| 2006/0247566 A1 | 11/2006 | Gobet et al. |
| 2006/0260365 A1 | 11/2006 | Miyamoto |
| 2006/0265908 A1 | 11/2006 | Palmer et al. |
| 2006/0283042 A1 | 12/2006 | Greene et al. |
| 2006/0283048 A1 | 12/2006 | Lebo |
| 2007/0022627 A1 | 2/2007 | Sokolowski et al. |
| 2007/0062067 A1 | 3/2007 | Covatch |
| 2007/0101615 A1 | 5/2007 | Munns |
| 2007/0101616 A1 | 5/2007 | Munns |
| 2007/0180730 A1 | 8/2007 | Greene et al. |
| 2007/0245595 A1 | 10/2007 | Chen et al. |
| 2007/0271821 A1 | 11/2007 | Meschter |
| 2007/0271822 A1 | 11/2007 | Meschter |
| 2008/0005930 A1 | 1/2008 | Skirrow |
| 2008/0022523 A1 | 1/2008 | Wang et al. |
| 2008/0078103 A1 | 4/2008 | Liles |
| 2008/0110048 A1 | 5/2008 | Dua et al. |
| 2008/0110049 A1 | 5/2008 | Sokolowski et al. |
| 2008/0250668 A1 | 10/2008 | Marvin et al. |
| 2009/0126081 A1 | 5/2009 | Lambertz |
| 2009/0126225 A1 | 5/2009 | Jarvis |
| 2009/0126823 A1 | 5/2009 | Yengkhom |
| 2009/0193961 A1 | 8/2009 | Jensen et al. |
| 2009/0241374 A1 | 10/2009 | Sato et al. |
| 2009/0306762 A1 | 12/2009 | McCullagh et al. |
| 2010/0018075 A1 | 1/2010 | Meschter et al. |
| 2010/0043253 A1 | 2/2010 | Dojan et al. |
| 2010/0095556 A1 | 4/2010 | Jarvis |
| 2010/0095557 A1 | 4/2010 | Jarvis |
| 2010/0107442 A1 | 5/2010 | Hope et al. |
| 2010/0139057 A1 | 6/2010 | Soderberg et al. |
| 2010/0154256 A1 | 6/2010 | Dua |
| 2010/0175276 A1 | 7/2010 | Dojan et al. |
| 2010/0199520 A1 | 8/2010 | Dua et al. |
| 2010/0251491 A1 | 10/2010 | Dojan et al. |
| 2010/0251564 A1 | 10/2010 | Meschter |
| 2010/0319215 A1 | 12/2010 | Roser |
| 2011/0041359 A1 | 2/2011 | Dojan et al. |
| 2011/0067271 A1 | 3/2011 | Foxen et al. |
| 2011/0078921 A1 | 4/2011 | Greene et al. |
| 2011/0088285 A1 | 4/2011 | Dojan et al. |
| 2011/0094127 A1 | 4/2011 | Dana, III |
| 2011/0146104 A1 | 6/2011 | Lafortune |
| 2011/0239486 A1 | 10/2011 | Berger et al. |
| 2011/0266384 A1 | 11/2011 | Goodman et al. |
| 2012/0011744 A1 | 1/2012 | Bell et al. |
| 2012/0023786 A1 | 2/2012 | Dojan |
| 2012/0030965 A1 | 2/2012 | Greene et al. |
| 2012/0055044 A1 | 3/2012 | Dojan et al. |
| 2012/0066931 A1 | 3/2012 | Dojan et al. |
| 2012/0096742 A1 | 4/2012 | Shim |
| 2012/0100778 A1 | 4/2012 | Cho |
| 2012/0117826 A1 | 5/2012 | Jarvis |
| 2012/0144698 A1 | 6/2012 | McDowell |
| 2012/0159813 A1 | 6/2012 | Dua et al. |
| 2012/0180195 A1 | 7/2012 | Shull et al. |
| 2012/0186102 A1 | 7/2012 | Lee et al. |

(56) References Cited

U.S. PATENT DOCUMENTS

| | | |
|---|---|---|
| 2012/0198730 A1 | 8/2012 | Burch et al. |
| 2012/0233882 A1 | 9/2012 | Huffa et al. |
| 2012/0234052 A1 | 9/2012 | Huffa et al. |
| 2012/0240429 A1 | 9/2012 | Sokolowski et al. |
| 2012/0246973 A1 | 10/2012 | Dua |
| 2012/0255201 A1 | 10/2012 | Little |
| 2012/0279260 A1 | 11/2012 | Dua et al. |
| 2012/0291314 A1 | 11/2012 | Sokolowski et al. |
| 2012/0297643 A1 | 11/2012 | Shaffer et al. |
| 2013/0019500 A1 | 1/2013 | Greene |
| 2013/0025157 A1 | 1/2013 | Wan et al. |
| 2013/0055590 A1 | 3/2013 | Mokos |
| 2013/0081307 A1 | 4/2013 | del Biondi et al. |
| 2013/0125420 A1 | 5/2013 | Raghuprasad |
| 2013/0152424 A1 | 6/2013 | Dojan |
| 2013/0174446 A1 | 7/2013 | Antonelli et al. |
| 2013/0211492 A1 | 8/2013 | Schneider |
| 2013/0219636 A1 | 8/2013 | Dojan et al. |
| 2013/0239438 A1 | 9/2013 | Dua et al. |
| 2013/0255103 A1 | 10/2013 | Dua et al. |
| 2013/0260104 A1 | 10/2013 | Dua et al. |
| 2013/0260629 A1 | 10/2013 | Dua et al. |
| 2013/0269159 A1 | 10/2013 | Robitaille et al. |
| 2013/0269209 A1 | 10/2013 | Lang et al. |
| 2013/0269212 A1 | 10/2013 | Little |
| 2013/0291293 A1 | 11/2013 | Jessiman et al. |
| 2013/0304232 A1 | 11/2013 | Gries |
| 2013/0305465 A1 | 11/2013 | Siegismund |
| 2013/0305911 A1 | 11/2013 | Masson et al. |
| 2013/0312284 A1 | 11/2013 | Berend et al. |
| 2014/0000043 A1 | 1/2014 | Boardman et al. |
| 2014/0007458 A1 | 1/2014 | Berger et al. |
| 2014/0020191 A1 | 1/2014 | Jones et al. |
| 2014/0020192 A1 | 1/2014 | Jones et al. |
| 2014/0068838 A1 | 3/2014 | Beers et al. |
| 2014/0070042 A1 | 3/2014 | Beers et al. |
| 2014/0082905 A1 | 3/2014 | Wen |
| 2014/0082963 A1 | 3/2014 | Beers |
| 2014/0088688 A1 | 3/2014 | Lilburn et al. |
| 2014/0109441 A1 | 4/2014 | Mcdowell et al. |
| 2014/0130372 A1 | 5/2014 | Aveni et al. |
| 2014/0134405 A1 | 5/2014 | Yang |
| 2014/0137433 A1 | 5/2014 | Craig |
| 2014/0137434 A1 | 5/2014 | Craig |
| 2014/0150292 A1 | 6/2014 | Podhajny et al. |
| 2014/0173932 A1 | 6/2014 | Bell |
| 2014/0173934 A1 | 6/2014 | Bell |
| 2014/0173935 A1 | 6/2014 | Sabbioni |
| 2014/0182447 A1 | 7/2014 | Kang et al. |
| 2014/0189964 A1 | 7/2014 | Wen et al. |
| 2014/0196316 A1 | 7/2014 | Follet |
| 2014/0215850 A1 | 8/2014 | Redl et al. |
| 2014/0237854 A1 | 8/2014 | Fallon |
| 2014/0237858 A1 | 8/2014 | Adami et al. |
| 2014/0245633 A1 | 9/2014 | Podhajny |
| 2014/0259760 A1 | 9/2014 | Dojan et al. |
| 2014/0310983 A1 | 10/2014 | Tamm et al. |
| 2014/0310984 A1 | 10/2014 | Tamm et al. |
| 2014/0310986 A1 | 10/2014 | Tamm et al. |
| 2014/0310987 A1 | 10/2014 | Sokolowski et al. |
| 2014/0338222 A1 | 11/2014 | Song |
| 2014/0352173 A1 | 12/2014 | Bell et al. |
| 2014/0373389 A1* | 12/2014 | Bruce ............ A43B 23/04 36/87 |
| 2014/0377488 A1* | 12/2014 | Jamison ............ A43B 23/042 428/36.1 |
| 2015/0007451 A1* | 1/2015 | Bruce ............ A43B 23/0295 36/83 |
| 2015/0013187 A1 | 1/2015 | Taniguchi et al. |
| 2015/0052778 A1 | 2/2015 | Kirk et al. |
| 2015/0075031 A1 | 3/2015 | Podhajny et al. |
| 2015/0143716 A1 | 5/2015 | Longetai. |
| 2015/0143720 A1 | 5/2015 | Avar |
| 2015/0201705 A1 | 7/2015 | Doremus et al. |
| 2015/0201707 A1* | 7/2015 | Bruce ............ A43B 1/04 36/47 |
| 2015/0202915 A1 | 7/2015 | Lee |
| 2015/0272274 A1* | 10/2015 | Berns ............ A43B 23/0215 36/84 |
| 2015/0282564 A1 | 10/2015 | Meschter et al. |
| 2015/0282565 A1 | 10/2015 | Kilgore |
| 2015/0305442 A1 | 10/2015 | Ravindran |
| 2015/0313316 A1 | 11/2015 | Boucher et al. |
| 2015/0320139 A1 | 11/2015 | Peitzker |
| 2015/0342286 A1 | 12/2015 | Huffman et al. |
| 2015/0374064 A1 | 12/2015 | Pierobon |
| 2016/0021979 A1 | 1/2016 | Iuchi et al. |
| 2016/0029736 A1 | 2/2016 | Meir |
| 2016/0058100 A1 | 3/2016 | Dealey et al. |
| 2016/0076178 A1 | 3/2016 | Head et al. |
| 2016/0088899 A1 | 3/2016 | Liles et al. |
| 2016/0095377 A1 | 4/2016 | Tamm |
| 2016/0106182 A1 | 4/2016 | Yun |
| 2016/0166000 A1 | 6/2016 | Bruce et al. |
| 2016/0166007 A1 | 6/2016 | Bruce et al. |
| 2016/0166010 A1 | 6/2016 | Bruce et al. |
| 2016/0168774 A1 | 6/2016 | Breithaupt et al. |
| 2016/0174660 A1 | 6/2016 | Iuchi et al. |
| 2016/0185062 A1 | 6/2016 | Boucher et al. |
| 2016/0206044 A1 | 7/2016 | Dimoff et al. |
| 2016/0208421 A1 | 7/2016 | Baines et al. |
| 2016/0213095 A1 | 7/2016 | Kohatsu et al. |
| 2016/0286898 A1* | 10/2016 | Manz ............ A43B 23/0245 |
| 2016/0345675 A1* | 12/2016 | Bruce ............ A43B 23/0245 |
| 2016/0345676 A1* | 12/2016 | Bruce ............ D04C 1/06 |
| 2016/0345677 A1 | 12/2016 | Bruce et al. |
| 2017/0020231 A1 | 1/2017 | Hausmann et al. |
| 2017/0035149 A1 | 2/2017 | Bruce et al. |
| 2017/0138513 A1 | 5/2017 | Andresen et al. |
| 2017/0265596 A1 | 9/2017 | Bruce et al. |
| 2017/0325545 A1 | 11/2017 | Becker et al. |
| 2017/0325546 A1 | 11/2017 | Becker et al. |
| 2017/0347754 A1 | 12/2017 | Fuerst, Jr. et al. |
| 2018/0020762 A1 | 1/2018 | Jamison |
| 2018/0213878 A1 | 8/2018 | Bruce |
| 2018/0242689 A1 | 8/2018 | Bruce et al. |
| 2018/0343959 A1 | 12/2018 | Bruce et al. |
| 2018/0343961 A1 | 12/2018 | Bruce et al. |
| 2018/0343962 A1* | 12/2018 | Bruce ............ A43B 23/042 |
| 2018/0343963 A1* | 12/2018 | Bruce ............ A43B 23/042 |
| 2019/0008235 A1 | 1/2019 | Wu |
| 2019/0014854 A1 | 1/2019 | Santos et al. |
| 2019/0098955 A1 | 4/2019 | Bruce |
| 2019/0150552 A1 | 5/2019 | Casillas et al. |
| 2019/0231031 A1 | 8/2019 | Bruce et al. |
| 2019/0254386 A1 | 8/2019 | Bruce et al. |
| 2020/0146390 A1 | 5/2020 | Heidenfelder et al. |

FOREIGN PATENT DOCUMENTS

| | | |
|---|---|---|
| CN | 1121403 A | 5/1996 |
| CN | 1883325 A | 12/2006 |
| CN | 2930360 Y | 8/2007 |
| CN | 201175007 Y | 1/2009 |
| CN | 101426390 A | 5/2009 |
| CN | 201356120 Y | 12/2009 |
| CN | 101627843 A | 1/2010 |
| CN | 101801229 A | 8/2010 |
| CN | 102271548 A | 12/2011 |
| CN | 202536202 U | 11/2012 |
| CN | 202635759 U | 1/2013 |
| CN | 102987631 A | 3/2013 |
| CN | 202950101 U | 5/2013 |
| CN | 103415657 A | 11/2013 |
| CN | 203369442 U | 1/2014 |
| CN | 103653542 A | 3/2014 |
| CN | 203676256 U | 7/2014 |
| CN | 104185431 A | 12/2014 |
| CN | 204032521 U | 12/2014 |
| CN | 204526335 U | 8/2015 |
| CN | 105246362 A | 1/2016 |
| CN | 205831190 U | 12/2016 |
| DE | 726634 C | 10/1942 |

(56) References Cited

FOREIGN PATENT DOCUMENTS

| | | |
|---|---|---|
| DE | 1140107 B | 11/1962 |
| DE | 4306286 A1 | 9/1993 |
| DE | 19809085 A1 | 8/1999 |
| DE | 102011011185 A1 | 8/2012 |
| DE | 102011119245 A1 | 10/2012 |
| DE | 102012020216 A1 | 4/2014 |
| EP | 0372370 A2 | 6/1990 |
| EP | 1486601 A1 | 12/2004 |
| EP | 2657384 A1 | 10/2013 |
| EP | 2792261 A1 | 10/2014 |
| EP | 2792264 A2 | 10/2014 |
| EP | 2811056 A1 | 12/2014 |
| EP | 3011855 A1 | 4/2016 |
| FR | 1012719 A | 7/1952 |
| GB | 430805 A | 6/1935 |
| GB | 477556 A | 1/1938 |
| GB | 1083849 A | 9/1967 |
| GB | 1299353 | 12/1972 |
| JP | S51107964 U1 | 8/1976 |
| JP | H07054250 A | 2/1995 |
| JP | H0733076 B2 | 4/1995 |
| JP | H07216703 A | 8/1995 |
| JP | 08109553 A | 4/1996 |
| JP | 09322810 A | 12/1997 |
| JP | 10158965 A | 6/1998 |
| JP | 2001030361 A | 2/2001 |
| JP | 2004105323 A | 4/2004 |
| JP | 2004339651 A | 12/2004 |
| JP | 20050422266 A | 2/2005 |
| JP | 2005-60885 A | 3/2005 |
| JP | 2005102933 A | 4/2005 |
| JP | 2005-160697 A | 6/2005 |
| JP | 2005290628 A | 10/2005 |
| JP | 2006009175 A | 1/2006 |
| JP | 2006161167 A | 6/2006 |
| JP | 2008240187 A | 10/2008 |
| JP | 6527230 B2 | 5/2019 |
| KR | 20020038168 A | 5/2002 |
| KR | 100737426 B1 | 7/2007 |
| TW | 201105521 A | 2/2011 |
| WO | 98/24616 A1 | 6/1998 |
| WO | 0007475 A1 | 2/2000 |
| WO | 0036943 A1 | 6/2000 |
| WO | 03016036 A2 | 2/2003 |
| WO | 2009000371 A1 | 12/2008 |
| WO | 2010080182 A1 | 7/2010 |
| WO | 2010/100488 A1 | 9/2010 |
| WO | 2011082391 A1 | 7/2011 |
| WO | 2011111564 A1 | 9/2011 |
| WO | 2011126837 A2 | 10/2011 |
| WO | 2011137405 A2 | 11/2011 |
| WO | 2013071679 A1 | 5/2013 |
| WO | 2013126313 A2 | 8/2013 |
| WO | 2014134244 A1 | 9/2014 |
| WO | 2014209594 A1 | 12/2014 |
| WO | 2014209596 A1 | 12/2014 |
| WO | 2016093961 A1 | 6/2016 |
| WO | 2016191478 A1 | 12/2016 |

OTHER PUBLICATIONS

Office Action received for European Patent Application No. 16727106.3, dated Apr. 8, 2020, 6 pages.
International Search Report and Written Opinion dated Sep. 10, 2018 in International Patent Application No. PCT/US2018/035404, 13 pages.
Extended European Search Report received for European Patent Application No. 19191026.4, dated Mar. 12, 2020, 12 pages.
Notice of Allowance received for U.S. Appl. No. 14/565,598, dated Mar. 16, 2020, 8 pages.
Extended Search Report dated Nov. 29, 2019 in European Patent Application No. 19192467.9, 5 pages.
Partial search report dated Dec. 9, 2019 in European Patent Application No. 19191026.4, 15 pages.
International Preliminary Report on Patentability dated Dec. 12, 2019 in International Patent Application No. PCT/US2018/035417, 8 pages.
International Preliminary Report on Patentability dated Dec. 12, 2019 in International Patent Application No. PCT/US2018/035408, 10 pages.
International Search Report and Written Opinion received for PCT Patent Application No. PCT/US2019/036495, dated Nov. 8, 2019, 20 pages.
Non-Final Office Action received for U.S. Appl. No. 15/993,195, dated Feb. 6, 2020, 16 pages.
Decision to grant a European patent pursuant to Article 97(1) dated Nov. 8, 2018 in European Patent Application No. 14737100.9, 1 page.
Communication pursuant to Article 94(3) dated Nov. 22, 2018 in European Patent Application No. 16731401.2, 5 pages.
Communication pursuant to Article 94(3) dated Nov. 23, 2018 in European Patent Application No. 15787425.6, 7 pages.
Final Office Action dated Dec. 14, 2018 in U.S. Appl. No. 14/565,598, 22 pages.
Non-Final Office Action dated Dec. 28, 2018 in U.S. Appl. No. 14/721,450, 6 pages.
Notice of Allowance dated Jan. 11, 2019 in U.S. Appl. No. 15/613,983, 7 pages.
Final Office Action received for U.S. Appl. No. 14/163,438, dated Jan. 13, 2020, 12 pages.
International Preliminary Report on Patentability received for PCT Patent Application No. PCT/US2018/035404, dated Dec. 12, 2019, 8 pages.
Office Action received for European Patent Application No. 15787425.6, dated Jan. 23, 2020, 6 pages.
Summons to Attend Oral Proceedings received for European Patent Application No. 16001887.5, dated Dec. 2, 2019, 5 pages.
Final Office Action received for U.S. Appl. No. 14/566,215, dated Jan. 30, 2020, 26 pages.
International Search Report and Written Opinion dated Apr. 15, 2019 in International Patent Application No. PCT/US2018/061502, 18 pages.
Extended Search Report dated Aug. 16, 2019 in European Patent Application No. 18202740.9, 11 pages.
Non-Final Office Action dated Aug. 19, 2019 in U.S. Appl. No. 14/163,438, 15 pages.
Non-Final Office Action dated Aug. 21, 2009 in U.S. Appl. No. 14/566,215, 21 pages.
Notice of Allowance dated Sep. 16, 2019 in U.S. Appl. No. 14/721,450, 9 pages.
Final Office Action dated Aug. 27, 2018 in U.S. Appl. No. 14/721,450, 9 pages.
Final Office Action dated Sep. 11, 2018 in U.S. Appl. No. 14/495,252, 14 pages.
Communication under Rule 71(3) dated Feb. 20, 2019 in European Patent Application No. 15785032.2, 5 pages.
Communication under Rule 71(3) dated Mar. 13, 2019 in European Patent Application No. 15787396.9, 5 pages.
Non-Final Office Action dated Oct. 29, 2019 in U.S. Appl. No. 14/820,822, 15 pages.
Non-Final Office Action dated Nov. 1, 2019 in U.S. Appl. No. 14/565,598, 18 pages.
Branscomb et al., "New Directions in Braiding", Journal of Engineered Fibers and Fabrics, vol. 8, Issue Feb. 2013, http://www.jeffjournal.org, pp. 11-24.
http://www.apparelsearch.com/definitions/miscellaneous/braiding.htm.
Final Office Action dated Jun. 4, 2018 in U.S. Appl. No. 14/820,822, 14 pages.
Final Office Action dated Jul. 13, 2018 in U.S. Appl. No. 14/163,438, 15 pages.
Non-Final Office Action dated Oct. 1, 2018 in U.S. Appl. No. 14/820,822, 15 pages.
Final Office Action dated Apr. 25, 2019 in U.S. Appl. No. 14/820,822, 15 pages.
Partial search report dated Apr. 26, 2019 in European Patent Application No. 18202740.9, 13 pages.

(56) References Cited

OTHER PUBLICATIONS

Final Office Action dated May 1, 2019 in U.S. Appl. No. 14/721,450, 6 pages.
Communication pursuant to Article 94(3) dated May 13, 2019 in European Patent Application No. 16001887.5, 4 pages.
Communication under Rule 71(3) dated May 16, 2019 in European Patent Application No. 16731401.2, 5 pages.
Communication under Rule 71(3) dated Jun. 21, 2019 in European Patent Application No. 15785032.2, 2 pages.
Non-Final Office Action dated Jul. 9, 2019 in U.S. Appl. No. 14/721,450, 6 pages.
International Preliminary Report on Patentability received for PCT Patent Application No. PCT/US2018/061502, dated Jun. 4, 2020, 10 pages.
Non-Final Office Action received for U.S. Appl. No. 15/940,234, dated May 29, 2020, 12 pages.
Intention to Grant received for European Patent Application No. 16001887.5, dated Jul. 28, 2020, 8 pages.
Non-Final Office Action received for U.S. Appl. No. 16/404,286, dated Jul. 22, 2020, 5 pages.
Notice of Allowance received for U.S. Appl. No. 14/566,215, dated Aug. 12, 2020, 13 pages.
Office Action received for European Patent Application No. 15787425.6, dated Aug. 5, 2020, 6 pages.
Final Office Action received for U.S. Appl. No. 14/820,822, dated Jun. 9, 2020, 18 pages.
Final Office Action received for U.S. Appl. No. 15/993,180, dated Jun. 12, 2020, 15 pages.
Non-Final Office Action received for U.S. Appl. No. 14/163,438, dated Jun. 25, 2020, 14 pages.
Non-Final Office Action received for U.S. Appl. No. 16/192,129, dated Jun. 12, 2020, 10 pages.
Notice of Allowance received for U.S. Appl. No. 15/993,195, dated Jun. 5, 2020, 5 pages.
Office Action received for Canadian Patent Application No. 3020031, dated Jun. 5, 2020, 5 pages.
Office Action received for Indian Patent Application No. 201747019912, dated Jun. 16, 2020, 5 pages.
Office Action received for Indian Patent Application No. 201747019980, dated Jun. 16, 2020, 5 pages.
Notice of Allowance received for U.S. Appl. No. 15/903,542, dated May 8, 2020, 9 pages.
Final Office Action received for U.S. Appl. No. 15/940,234, dated Oct. 19, 2020, 10 pages.
Final Office Action received for U.S. Appl. No. 16/192,129, dated Oct. 30, 2020, 10 pages.
Non-Final Office Action received for U.S. Appl. No. 16/207,427, dated Oct. 19, 2020, 16 pages.
Intention to Grant received for European Patent Application No. 16727106.3, dated Nov. 20, 2020, 8 pages.
Office Action received for Canadian Patent Application No. 3020031, dated Nov. 24, 2020, 5 pages.
Non-Final Office Action received for U.S. Appl. No. 15/993,180, dated Dec. 11, 2020, 14 pages.
Notice of Allowance received for U.S. Appl. No. 16/404,286, dated Nov. 25, 2020, 5 pages.
Non-Final Office Action received for U.S. Appl. No. 14/820,822, dated Jan. 29, 2021, 16 pages.
Intention to Grant received for European Patent Application No. 15787425.6, dated Apr. 28, 2021, 4 pages.
Notice of Allowance received for U.S. Appl. No. 15/993,180, dated Apr. 1, 2021, 11 pages.
Office Action received for European Patent Application No. 18202740.9, dated Mar. 26, 2021, 4 pages.
Intention to Grant received for European Patent Application No. 19192467.9, dated Oct. 6, 2020, 8 pages.
Office Action received for Indian Patent Application No. 201747020263, dated Sep. 18, 2020, 7 pages.
Office Action received for Sri Lankan Patent Application No. 20033, dated Aug. 14, 2020, 1 page.
Office Action received for European U.S. Appl. No. 16/751,107, dated May 25, 2021, 7 pages.
Final Office Action received for U.S. Appl. No. 16/207,427, dated May 13, 2021, 14 pages.
Notice of Allowance received for U.S. Appl. No. 14/820,822, dated Jun. 8, 2021, 9 pages.
Office Action received for European Patent Application No. 19191026.4, dated Jul. 13, 2021, 5 pages.

* cited by examiner

BRAIDED ARTICLES AND METHODS FOR THEIR MANUFACTURE

CROSS-REFERENCE TO RELATED APPLICATIONS

This is a Nonprovisional Application that claims the benefit of U.S. Provisional Application No. 62/512,898, titled "Braided Articles And Methods For Their Manufacture," filed on May 31, 2017, which is hereby expressly incorporated by reference in its entirety. This Nonprovisional Application is related by subject matter to concurrently filed U.S. Nonprovisional application Ser. No. 15/993,180, entitled "Braided Articles And Methods For Their Manufacture," and concurrently filed U.S. Nonprovisional application Ser. No. 15/993,195, entitled "Braided Articles And Methods For Their Manufacture,". Like this Nonprovisional Application, the aforementioned Applications also claim the benefit of U.S. Provisional Application No. 62/512,898, titled "Braided Articles And Methods For Their Manufacture," filed on May 31, 2017, and are assigned to or under obligation of assignment to the same entity as this Nonprovisional Application.

TECHNICAL FIELD

Aspects herein relate braided articles and in particular, braided articles of footwear.

BACKGROUND

Traditional shoes are often made from textiles or materials that have uppers that are cut to a desired shape and stitched together. Newer methods also now include forming shoe uppers from a knitted textile. Still newer methods involve braiding a tubular textile for use as the shoe upper. Aspects herein relate to braiding tubular structures that in some aspects are used in articles of footwear.

BRIEF DESCRIPTION OF THE DRAWINGS

Aspects herein is described in detail below with reference to the attached drawing figures, wherein.

DETAILED DESCRIPTION

Aspects described herein are directed to braided articles and methods for their manufacture. Braiding offers many advantages over knitting or weaving such as, for example, the reduction of frictional forces applied to the yarns used in the creation of the braided structure, the ability to use high denier yarns (e.g., between 800D to 20000D, between 1000D to 10000D, between 1000D to 5000D, and the like), the ability to combine different types of yarns with non-yarn materials such as, for example, rubber strands, ropes, metals, and the like.

Braiding is a process of interlacing or interweaving three or more yarns diagonally to a product axis in order to obtain a thicker, wider or stronger product or in order to cover (overbraid) some profile. Interlacing diagonally means that the yarns make an angle with the product axis, which can be between 1° and 89° but is usually in the range of 30°-80°. This angle is called the braiding angle. Braids can be linear products (ropes), hollow tubular shells or solid articles (one, two or three-dimensional textiles) with constant or variable cross-section, and of closed or open appearance.

As used herein, the yarns, filaments, or other materials used for braiding may be formed of different materials having different properties. The properties that a particular yarn or other will impart to an area of a braided component partially depend upon the materials that form the yarn. Cotton, for example, provides a softer product, natural aesthetics, and biodegradability. Elastane and stretch polyester each provide substantial stretchability and fast recovery, with stretch polyester also providing recyclability. Rayon provides high luster and moisture absorption. Wool provides high moisture absorption in addition to having insulating properties and biodegradability. Nylon is a durable and abrasion-resistant material with relatively high strength. Polyester is a hydrophobic material that also provides relatively high durability. In addition to materials, other aspects of the yarn selected for formation of a braided component may affect the properties of the braided component. For example, a yarn may be a monofilament or a multifilament. The yarn may also include separate filaments that are each formed of different materials. In addition, the yarn may include filaments that are each formed of two or more different materials, such as a bicomponent yarn with filaments having a sheath-core configuration or two halves formed of different materials.

Figure 1:
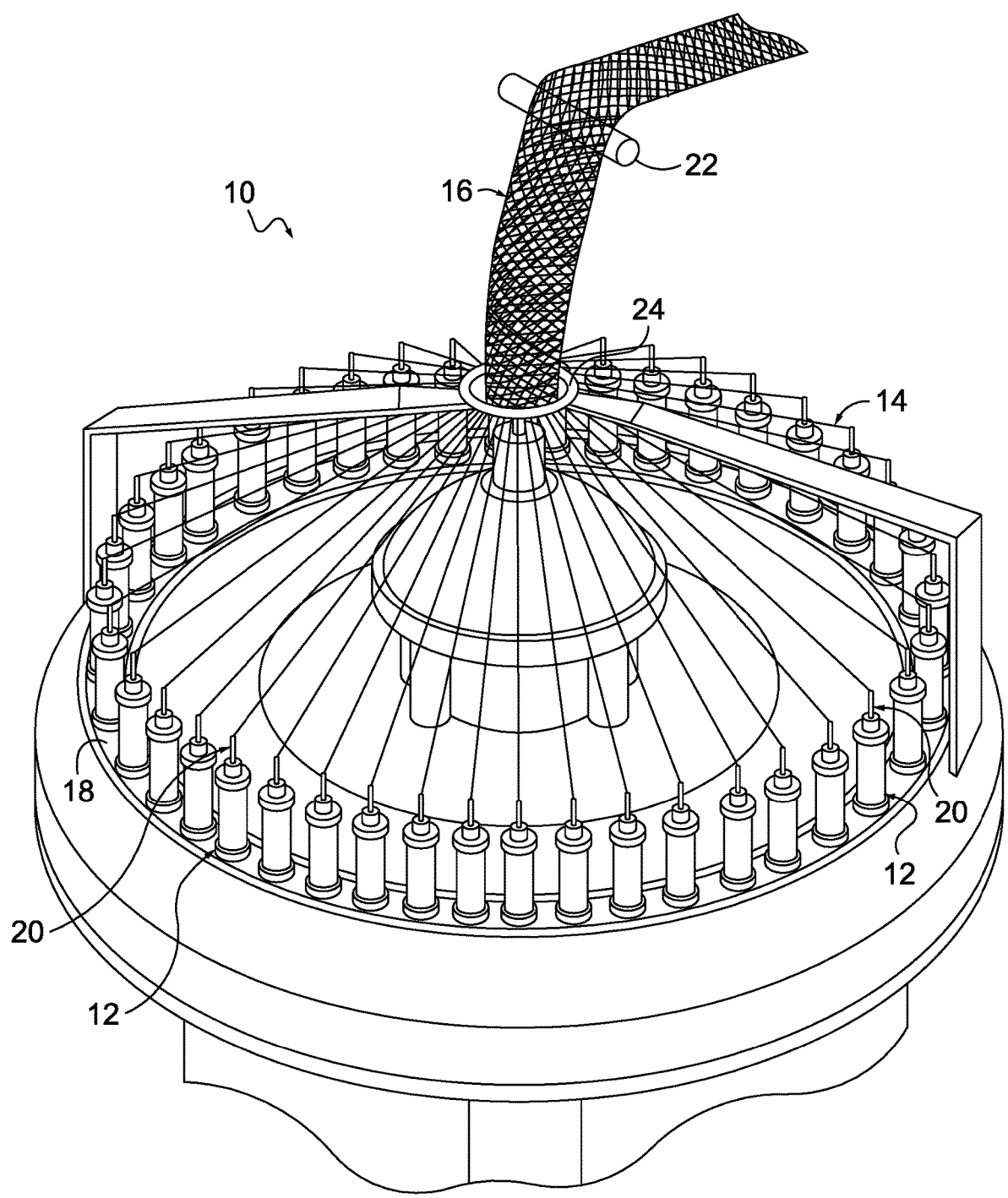
FIG. 1 depicts a perspective view of a braiding machine in accordance with aspects herein.

As stated above, braided articles can be formed as tubular braids on a braiding machine. Different types of braiding machines such as a radial, axial or lace are available. One example of a lace braiding machine can be found in Ichikawa, EP 1 486 601, granted May 9, 2007 entitled "Torchon Lace Machine" and EP No. 2 657 384, published Oct. 30, 2013 entitled "Torchon Lace Machine," the entirety of which are hereby incorporated by reference. The upper portion of an exemplary braiding machine 10 is shown in FIG. 1. Braiding machine 10 includes a plurality of spools 12. In some embodiments, the spools 12 carry the yarn 14 selected for braiding. The yarns 14 from individual spools are selectively interlaced or intertwined with one another by the braiding machine 10. This interlacing or intertwining of strands forms a braided article 16, as further described below. Each of the spools 12 is supported and constrained by a track 18 about the circumference of the braiding machine 10. Each spool 12 has a tensioner 20 (shown schematically in FIG. 1) that operates, along with a roller 22, to maintain a desired tension in the yarns 14 and the braided article 16. As the yarns 14 extend upwardly, they pass through a braid ring 24 that is generally considered the braiding point. The braiding point is defined as the point or area where yarns 14 consolidate to form braided article 16. At or near braid ring 24, the distance between yarns 14 from different spools 12 diminishes. As the distance between yarns 14 is reduced, the yarns 14 intermesh (i.e. interlace) or braid with one another in a tighter fashion and are pulled linearly by roller 22.

Figure 2:
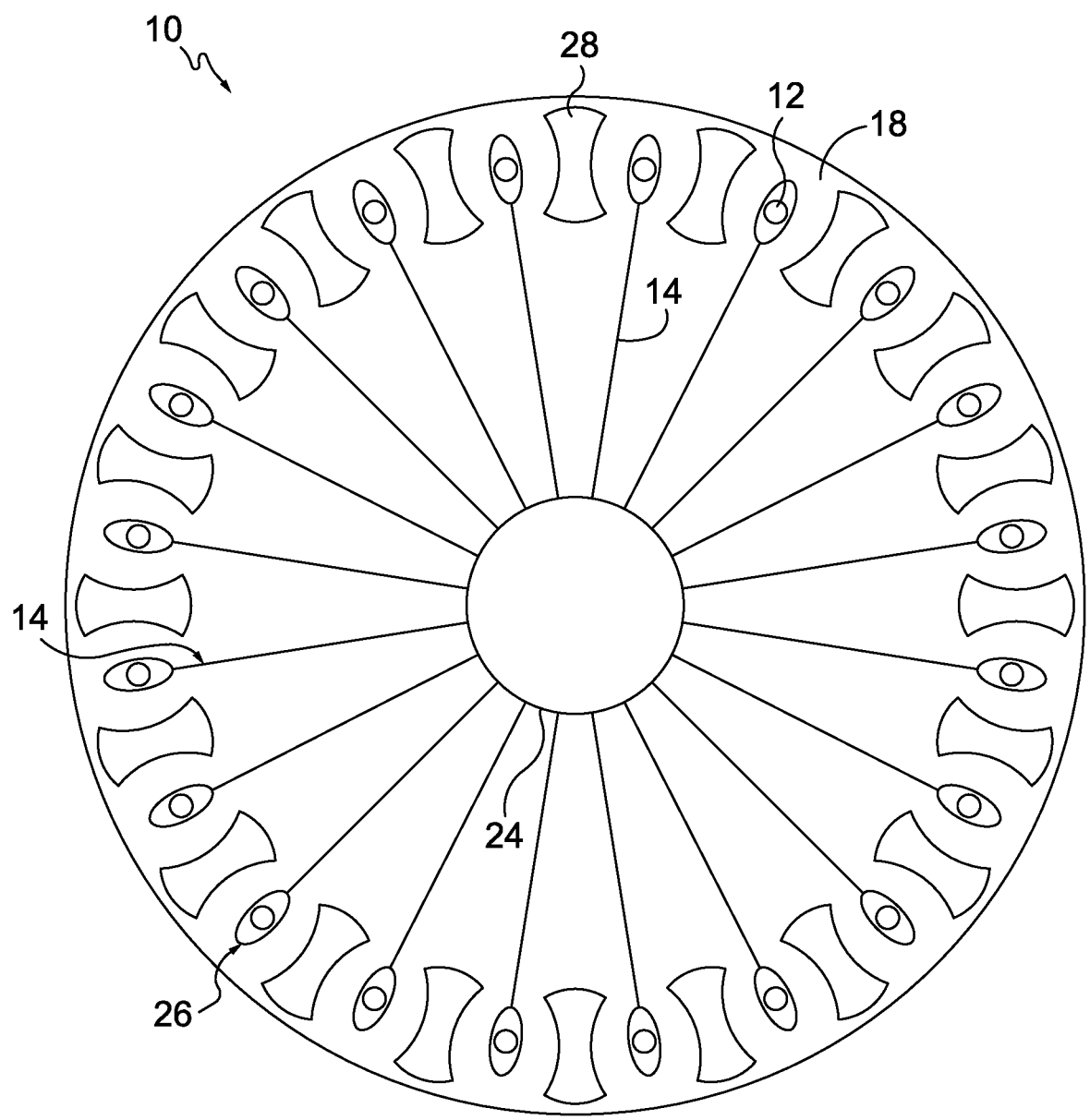
FIG. 2 depicts a schematic top-down view of the braiding machine in an initial configuration in accordance with aspects herein.
Figure 3:
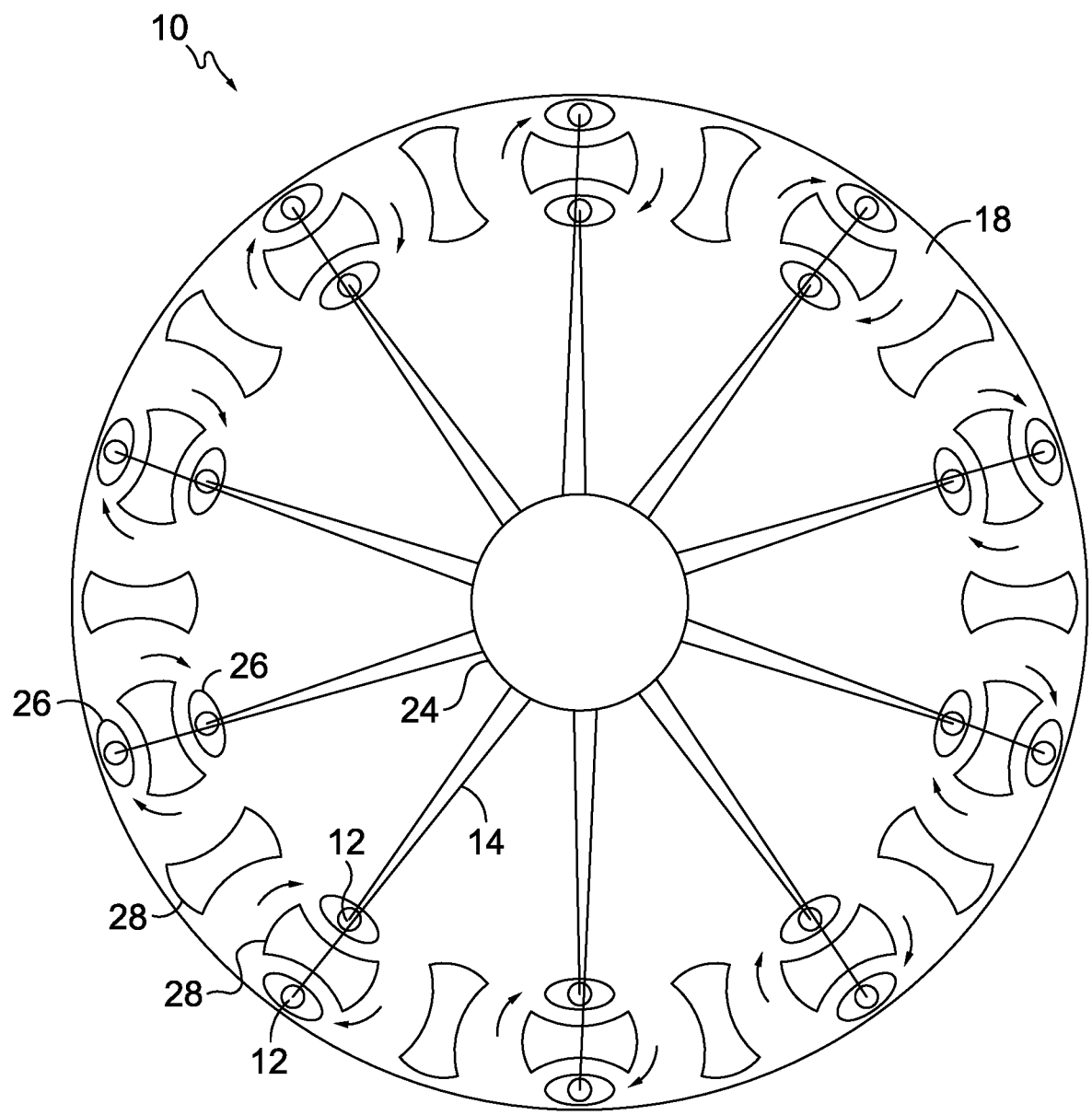
FIG. 3 depicts a schematic top-down view of the braiding machine in an active configuration in accordance with aspects herein.
Figure 4:
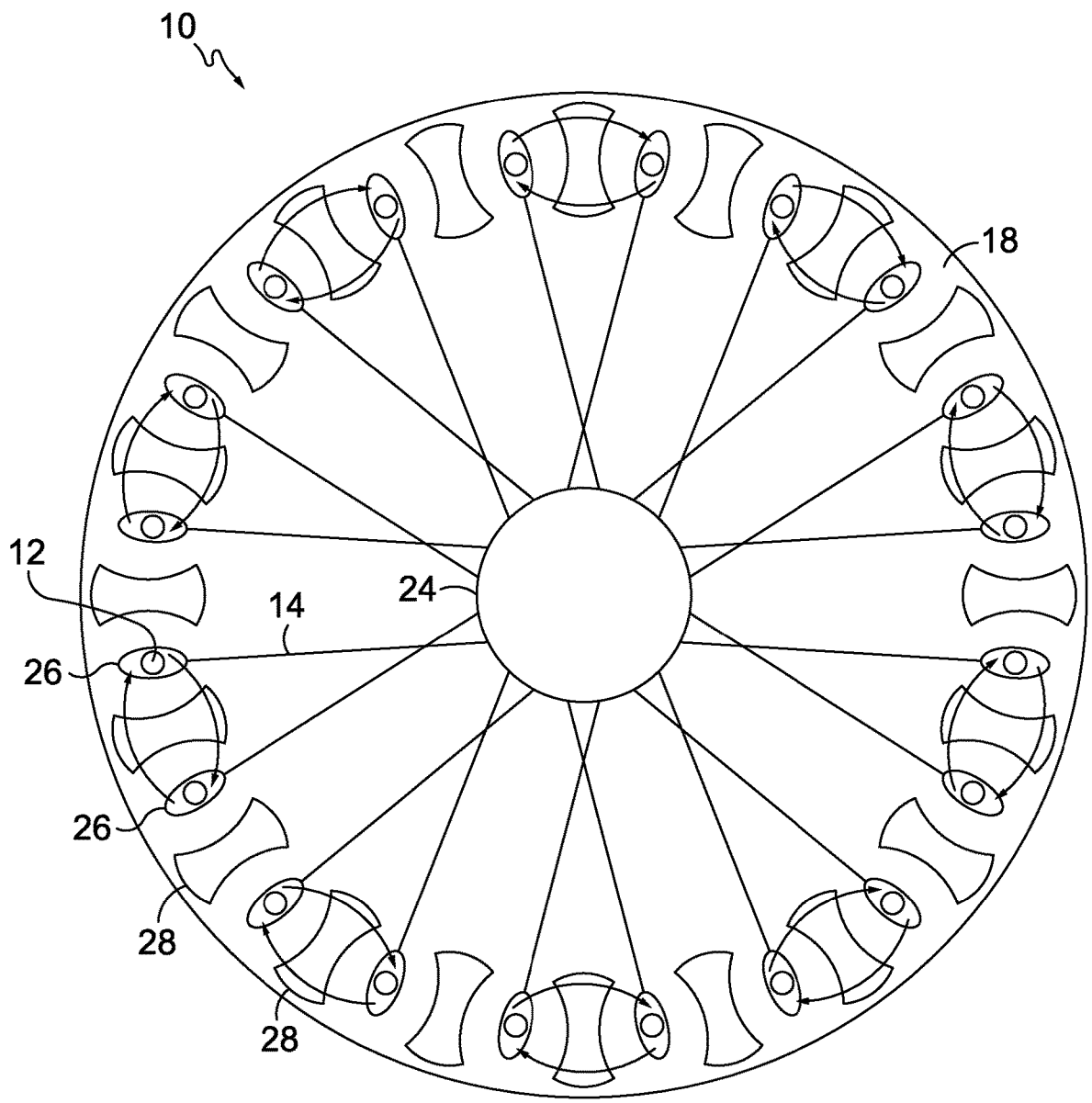
FIG. 4 depicts a schematic top-down view of the braiding machine in a different active configuration from FIG. 3 in accordance with aspects herein.

As best seen in FIG. 2, each spool 12 is carried and supported by a carriage 26. Each spool 12 is movable about the circumference of the track 18 by rotor metals 28. As described on the Torchon Lace Machine referenced previously, and disclosed in EP 1 486 601, each of the rotor metals 28 can be moved clockwise or counterclockwise. In contrast to radial braiding machines or fully non-jacquard machines, in a lace braiding machine, each rotor metal is not intermeshed with the adjacent rotor metal. Instead, each rotor metal 28 may be selectively independently movable. As can be seen by comparing FIG. 3 to FIG. 4, as the rotor metals 28 rotate, they move the carriages 26, and thus the spools 12 supported on the carriages 26 by moving them about the circumference of the track 18. The braiding machine 10 is programmable such that the individual rotor metals 28 rotate the carriages 26, and thus the spools 12 to move them about the circumference of the track 18. As an individual spool 12 moves relative to an adjacent spool 12, the yarns 14 carried on the spools 12 interlace to create a desired braid pattern. The movement of spools 12 may be pre-programmed to form particular shapes, designs, and to specify thread densities of a braided component or portions of a braided component. By varying the rotation and location of individual spools 12 various braid configurations may be formed. Such an exemplary braiding machine may form intricate braid configurations including both jacquard and non-jacquard braid configurations or geometries. Such configurations and geometries offer design possibilities beyond those offered by other textiles, such as knitting or weaving.

In some aspects, the size of braiding machine 10 may be varied. It should be understood that the braiding machine 10 shown and described is for illustrative purposes only. In some aspects, braiding machine 10 may be able to accept, for example, 144 carriages, although other sizes of braiding machines, carrying different numbers of carriages and spools is possible and is within the scope of this disclosure. By varying the number of carriages and spools within a braiding machine, the density of the braided articles as well as the size of the braided component may be altered.

A Braided Article of Footwear with an Integrally and Contiguously Braided Framework for Reinforcement.

In one aspect in accordance herein, the technology described herein is related to a braided article of footwear comprising a braided upper having a braided layer with a first surface and a second surface. The braided upper being formed from at least a high performance yarn and a base yarn, where the high performance yarn forms an integrally and contiguously braided framework in the braided upper. The braided framework forms a pattern on the braided upper. The first surface of the braided upper defines a medial side and a lateral side having at least a toe portion, a heel portion opposite the toe portion, a midfoot portion extending between the toe portion and the heel portion, and a throat portion at the apex of the midfoot portion and extending through the medial side and the lateral side, where the throat portion is further defined by at least a first edge and an opposite second edge spaced apart from the first edge.

The high performance yarns and the base yarns may be braided together to form the braided upper having the integrally and contiguously braided framework to add structural integrity and support to the braided upper. For example, the high performance yarns may include high tenacity yarns that have higher strength than the base yarns such as carbon fiber yarns, aramid fiber yarns, liquid crystal polymer yarns, high strength nylon yarns, and the like. The strength of the yarn may generally refer to the yarn's tensile strength properties, such as the yarn's breaking force. Additionally or alternatively, the high performance yarns in accordance with aspects herein may, for example, be high denier yarns ranging between, 800D and 20000D, 1000D and 10000D, 1000D and 9000D, 1000D and 5000D, and the like. Further, the high performance yarns in accordance with aspects herein may further include, for example, composite yarns that may include filaments that are each formed of two or more different materials, such as in a bicomponent yarn with filaments having a sheath-core configuration or two halves formed of different material. The composite yarns may include, for example, a polyester core, a nylon core, or any of the high tenacity material yarns described above as the core and a thermoplastic material sheath, such as, for example, thermoplastic polyurethane (TPU), a silicone based thermoplastic material, and the like. The bicomponent yarns in accordance with aspects herein may be further processed, for example, to create locked down areas for the article of footwear by selectively applying heat to melt the thermoplastic material only in certain areas of the article of footwear where the composite yarn is present (e.g., using a masking technique to protect other areas).

The braided framework in accordance with aspects herein may form a specific pattern profile to target certain portions of the braided upper aligning with specific areas of a wearer's foot to provide increased support in those areas. For example, a midfoot region of a wearer's foot may benefit from additional support and, thus, the braided framework may extend through, for example, the midfoot portion on at least one of the medial side, lateral side, and/or the underfoot side of the braided upper aligning with the midfoot region of the wearer's foot. The high tenacity and low stretchability of the high performance yarns used for forming the braided framework may provide stability to the midfoot region by preventing the braided upper from shifting or stretching in the midfoot region, especially with continued wear of the article of footwear.

Another exemplary location for the braided framework may be, for example, at a heel portion of the braided upper to provide increased support to a heel area of a wearer's foot when the article of footwear is worn, thereby preventing the article of footwear from stretching or becoming loosened in the heel portion of the article of footwear. Stabilizing the heel of a wearer's foot may be important to prevent injuries caused by twisting for example a misstep, or the like. In some aspects, the articles of footwear in accordance with aspects herein may further extend above an ankle area of a wearer, thereby providing stabilization of the wearer's ankle when the article of footwear is worn. Further, providing the braided framework, in addition to providing visual appeal to the article of footwear, may prevent the premature stretching of the article of footwear in areas prone to stretching due to the movement of a wearer's foot during normal or extreme wear conditions (i.e., sports). In addition to the general areas described above, the braided framework, when formed by braiding composite yarns, may further extend through at a toe portion of the article of footwear to prevent undesirable stretch in the toe region as well as protecting the article of footwear by locking down the yarns and forming a seal around the toe portion of the article of footwear by selectively applying heat to the desired locked regions. Aspects of the braided framework and the locations for the braided framework will become more apparent with reference to FIG. 5A-FIG. 8, as described below.

Figure 5A:
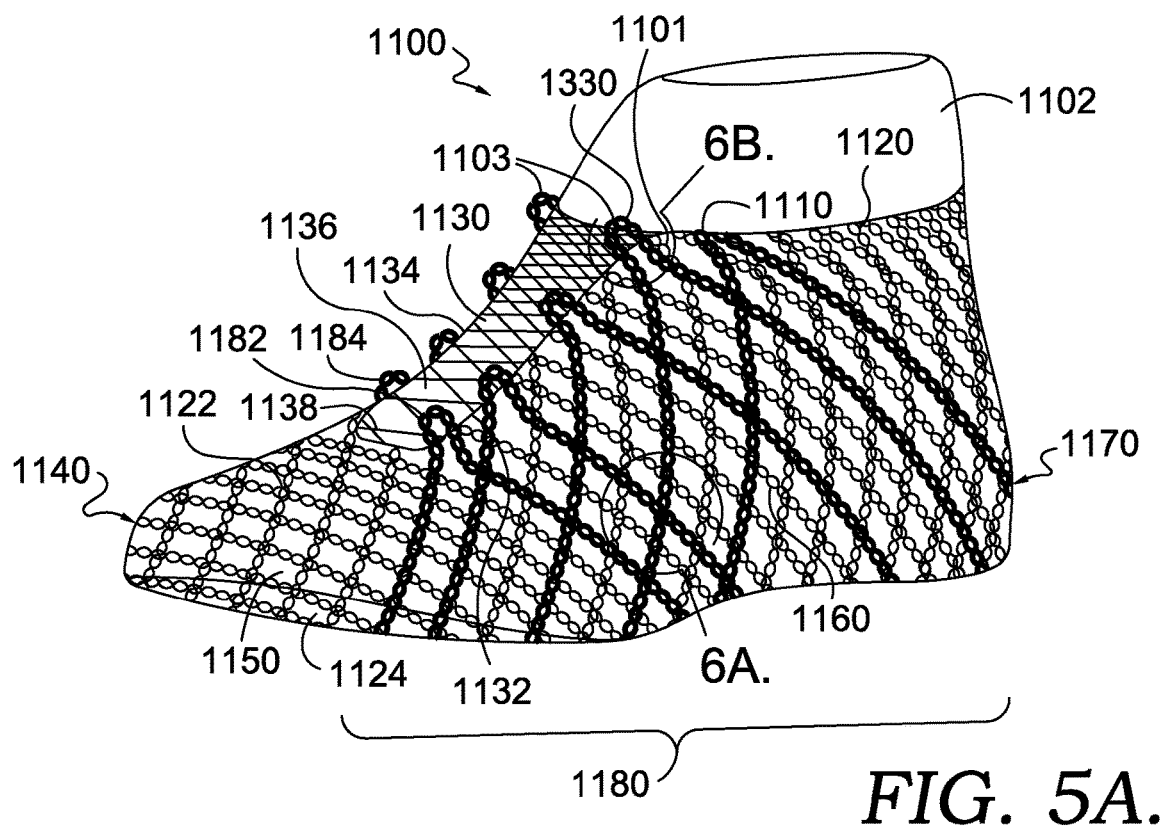
FIG. 5A depicts a perspective view of an upper portion of a lasted article of footwear in accordance with aspects herein.

FIG. 5A depicts a perspective view of a lasted unitary braided upper 1100 on a last 1102. The unitary braided upper 1100 having a first surface 1122 and a second surface 1124. The first surface 1122 of the unitary braided upper 1100 may define at least a toe portion 1140, a heel portion 1170, a lateral midfoot portion 1160, a medial midfoot portion 1220 (shown in FIG. 5C), and the second surface 1124 defining an underfoot portion 1210 (shown in FIG. 5C). The unitary braided upper 1100 may be braided from one or more composite yarns and/or high performance yarns 1110, and one or more base yarns 1120. Further, the unitary braided upper 1100 may have an integrally braided throat portion 1130 defined at least by a lateral edge 1132 that is spaced apart from a medial edge 1134. Optionally, the space or gap 1136 between the lateral edge 1132 and the medial edge 1134, may be closed by providing a tongue element (not shown), or a braided elastic portion 1138 covering a top portion of a wearer's foot when the braided article of footwear is worn by a wearer. The braided elastic portion 1138 may comprise, for example, elastic yarns to aid in the donning and doffing of the article of footwear, and at the same time, secure the article of footwear on the last 1102 or a wearer's foot when the article of footwear is worn, as described in more detail below.

Figure 5B:
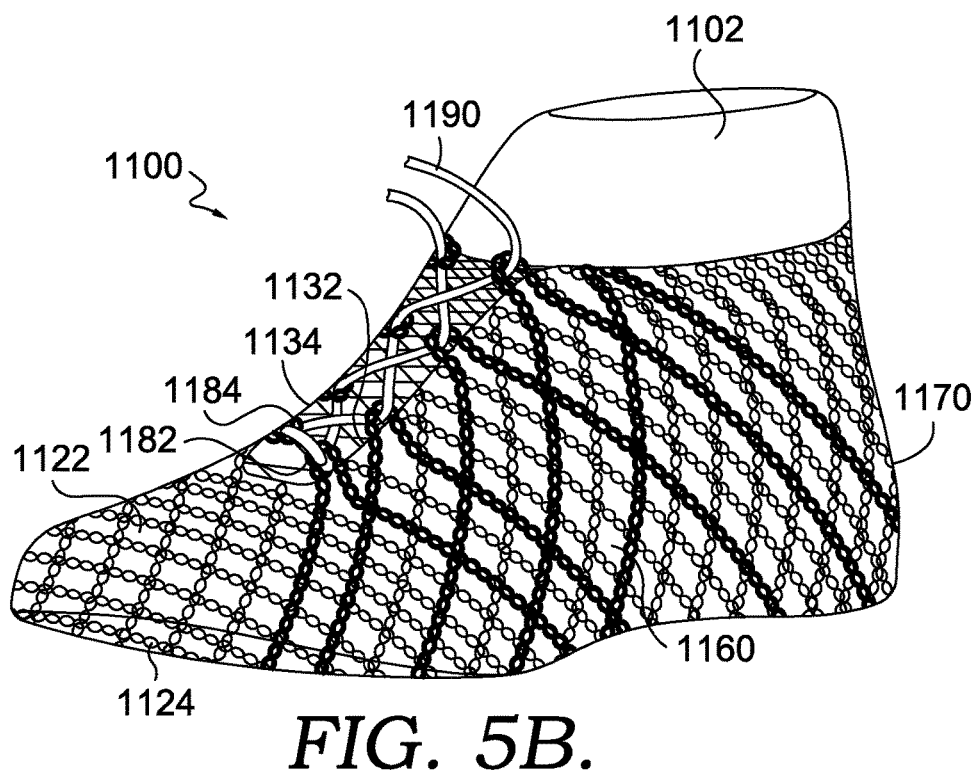
FIG. 5B depicts a perspective view of the upper portion of the lasted article of footwear in FIG. 5A with a lace framework in accordance with aspects herein.
Figure 5C:
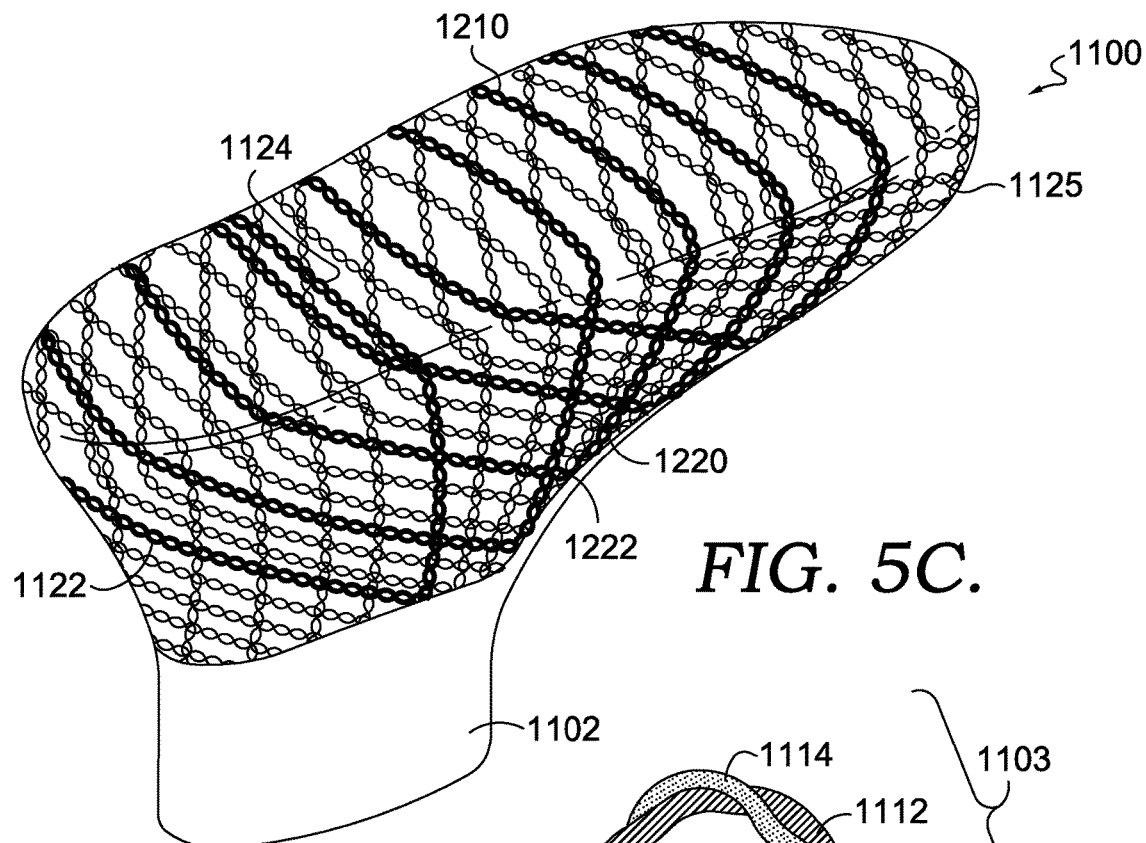
FIG. 5C depicts a perspective view of a lower portion of a lasted article of footwear in accordance with aspects herein.

As described above, the high performance yarns 1110 in accordance with aspects herein, are integrally and contiguously braided with the unitary braided upper 1100, and form a braided framework 1180 that provides extra support to the foot of a wearer when the article of footwear comprising the unitary braided upper 1100, is worn. Although the braided framework 1180 shown in FIGS. 5A-5C forms a crisscross pattern profile other pattern profiles, such as, for example, linear, curvilinear, organic, geometric, logos, and the like, are possible and are within the scope of this disclosure. In addition to the advantages of braiding outlined above, the braided uppers in accordance with aspects herein may be highly breathable by inherently forming openings 1150 throughout the braided upper when the plurality of base yarns 1120 and the one or more high performance yarns 1110 are interlaced with each other to form the unitary braided upper 1100 in accordance with aspects herein. Furthermore, as shown in FIGS. 5A-C, the unitary braided upper 1100 may provide a seamless 360° coverage to a wearer's foot, thereby increasing the comfort level for a wearer by eliminating seams that may cause irritation to a wearer's skin by contacting and/or rubbing against the wearer's skin. Further, the lack of seams may further provide for a more durable article of footwear because the number of seams that may potentially fail, is effectively reduced by providing a unitary and continuously braided upper 1100 that includes the underfoot portion 1210, as shown in FIG. 5C.

Figures 6A, 6B:
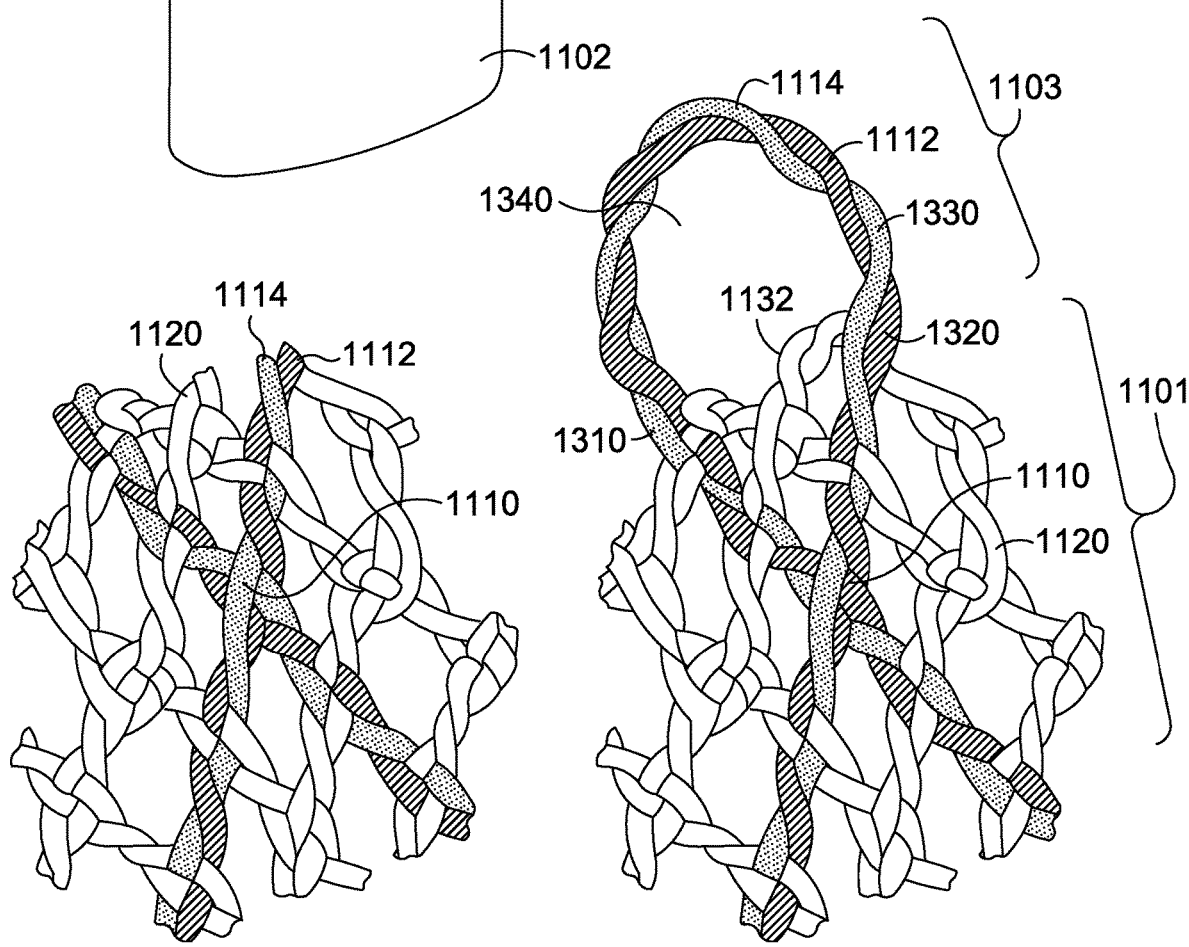
FIG. 6A depicts a close up view of area 6A in FIG. 5A in accordance with aspects herein.
FIG. 6B depicts a close up view of area 6B in FIG. 5A in accordance with aspects herein.

FIG. 6A shows a close up view of the unitary braided upper 1100 in FIG. 5A in area 6A. As can be seen in the close up view, the high performance yarns 1110 and the base yarns 1120 are integrally braided (i.e. interlaced) with each other, where the high performance yarns are braided to form the braided framework 1180 forming a specific pattern that may be visually perceptible such as, for example, the crisscross pattern shown in the figures. As shown more clearly, the pattern of the braided framework 1180 may be different in different portions of the unitary braided upper 1100. For example, the braided framework 1180 forms a crisscross pattern only on the medial midfoot portion 1220 and the lateral midfoot portion 1160 of the unitary braided upper 1100, while at the underfoot portion 1210, the braided framework 1180 forms a pattern comprised of parallel lines extending across the underfoot portion 1210. Further, as briefly described above, other patterns for the braided framework are contemplated. For example, the braided pattern may consist of a plurality of stacked auxetic hexagons, continuously linear (as shown in the underfoot portion 1210 not crisscrossing at any point), a plurality of stacked shapes in general such as, for example, logos, geometric shapes, organic shapes, and the like to provide visual appeal in addition to the stabilization and reinforcement provided by the high performance yarns. Further, because braiding is a low friction technique for producing textiles, yarns of different materials, weights, strands of materials, and the like may be used to form the braided framework 1180 as an integral part of the braided upper 1100. Further, as seen from the close-up view in FIG. 6A, the braided framework may be comprised of one or more types of high performance yarns. In other words, high performance yarn 1112 may be one type of high performance yarn and high performance yarn 1114 may be the same type of high performance yarn as high performance yarn 1112, or high performance yarn 1114 may be a different type of high performance yarn as high performance yarn 1112, depending on the properties desired for the finalized braided article of footwear. Further, although only two types are shown here, as described above, many different types of braided structures are available for imparting different types of properties to the overall braided article, and therefore, depending on the number of strands needed to form a particular braided structure, more different types of yarns may be added in the braided structure to maximize the physical properties of the braided structure and the physicochemical properties of the yarns used.

Figure 7A:
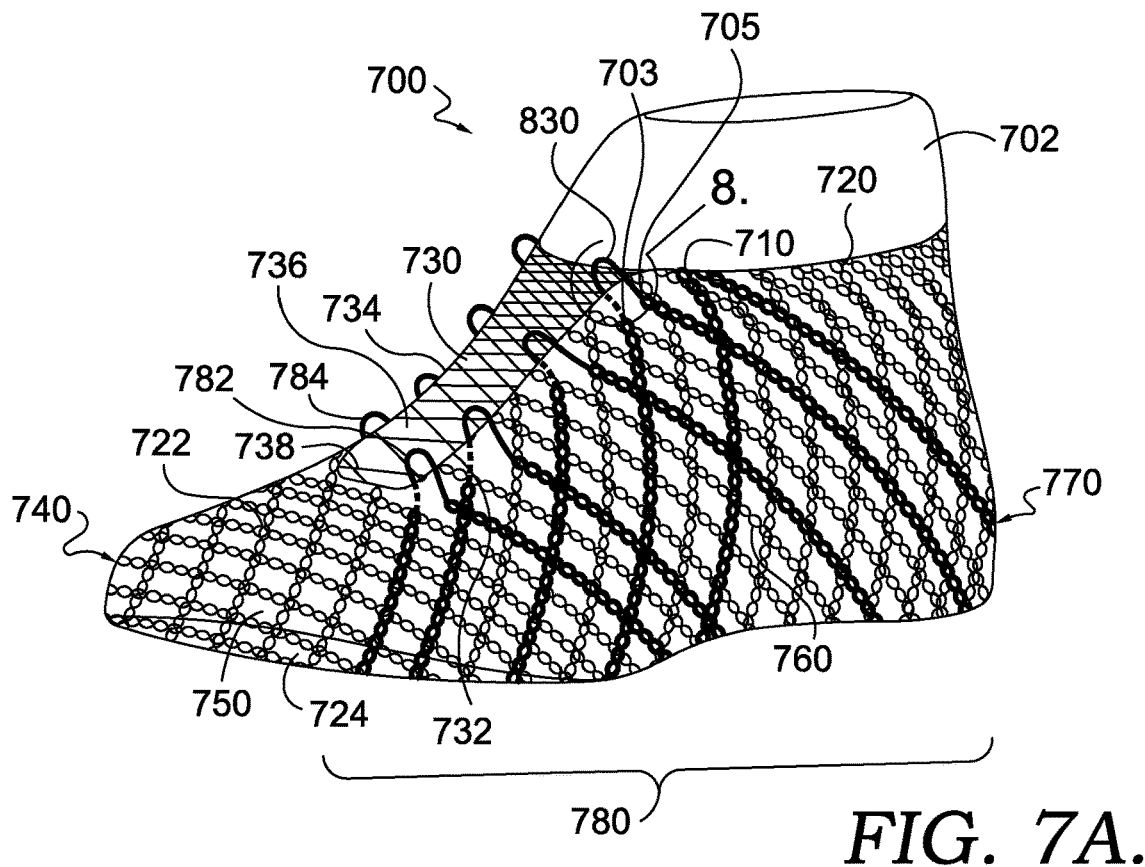
FIG. 7A depicts a perspective view of an upper portion of a lasted article of footwear in accordance with aspects herein.

FIG. 7A depicts a perspective view of a different lasted unitary braided upper 700 on a last 702, similar to the one described above with respect to FIGS. 5A-C. The unitary braided upper 700 having a first surface 722 and a second surface 724. The first surface 722 of the unitary braided upper 700 may define at least a toe portion 740, a heel portion 770, a lateral midfoot portion 760, a medial midfoot portion (not shown, but similar to the medial midfoot portion 1220 shown in FIG. 5C). The second surface 724 may define an underfoot portion (partially visible in FIGS. 7A and 7B that is similar to the underfoot portion 1210 shown in FIG. 5C). The unitary braided upper 700 may be braided from one or more composite yarns and/or high performance yarns 710, and one or more base yarns 720. Further, the unitary braided upper 700 may have an integrally braided throat portion 730 defined at least by a lateral edge 732 that is spaced apart from a medial edge 734. Optionally, the space or gap 736 between the lateral edge 732 and the medial edge 734, may be closed by providing a tongue element (not shown), or a braided elastic portion 738 covering a top portion of a wearer's foot when the braided article of footwear is worn by a wearer. The braided elastic portion 738 may comprise, for example, elastic yarns to aid in the donning and doffing of the article of footwear, and at the same time, secure the article of footwear on the last 702 or a wearer's foot when the article of footwear is worn, as described in more detail below.

Figure 7B:
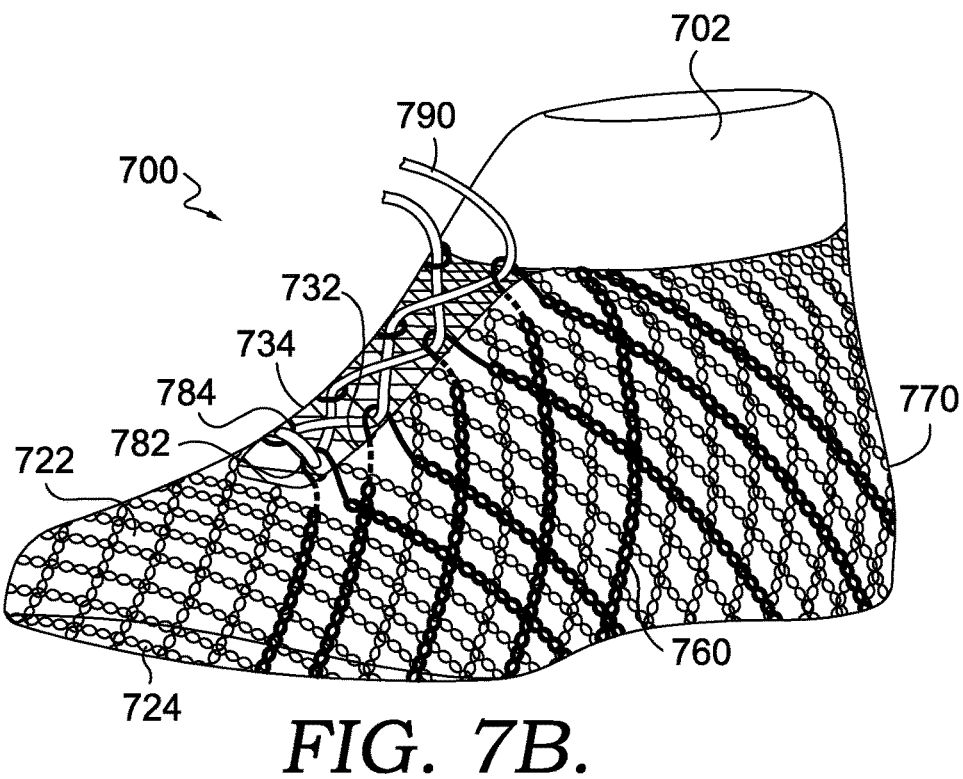
FIG. 7B depicts a perspective view of the upper portion of the lasted article of footwear in FIG. 7A with a lace framework in accordance with aspects herein.

As described above, the high performance yarns 710 in accordance with aspects herein, are integrally and contiguously braided with the unitary braided upper 700, and form a braided framework 780 that provides extra support to the foot of a wearer when the article of footwear comprising the unitary braided upper 700, is worn. Although the braided framework 780 shown in FIGS. 7A and 7B forms a crisscross pattern profile other pattern profiles, such as, for example, linear, curvilinear, organic, geometric, logos, and the like, are possible and are within the scope of this disclosure. In addition to the advantages of braiding outlined above, the braided uppers in accordance with aspects herein may be highly breathable by inherently forming openings 750 throughout the braided upper when the plurality of base yarns 720 and the one or more high performance yarns 710 are interlaced with each other to form the unitary braided upper 700 in accordance with aspects herein. Furthermore, as shown in FIG. 7A-B, the unitary braided upper 700 may provide a seamless 360° coverage to a wearer's foot, thereby increasing the comfort level for a wearer by eliminating seams that may cause irritation to a wearer's skin by contacting and/or rubbing against the wearer's skin. Further, the lack of seams may further provide for a more durable article of footwear because the number of seams that may potentially fail, is effectively reduced by providing a unitary and continuously braided upper 700 that includes the underfoot portion as well.

Figure 8:
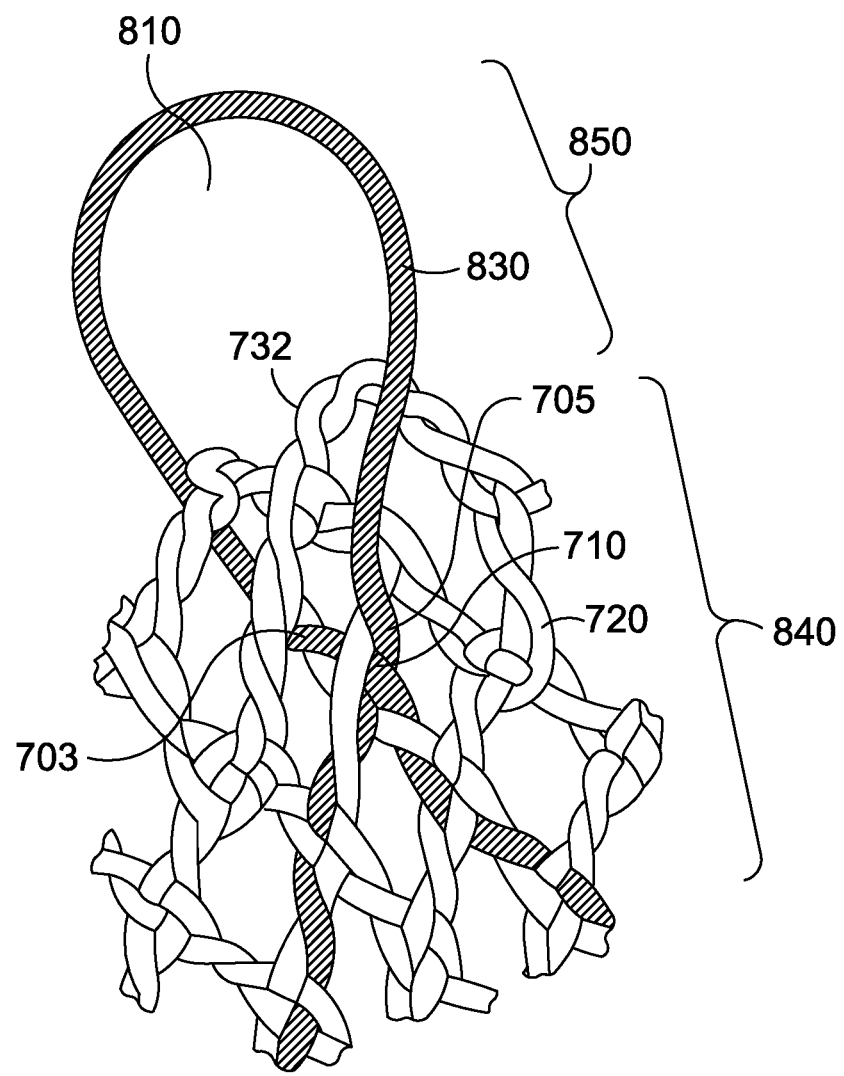
FIG. 8 depicts a close up view of area 8 in FIG. 7A in accordance with aspects herein.

FIG. 8 shows a close up view of the unitary braided upper 700 in FIG. 7A in area 8. As can be seen in the close up view, the high performance yarn(s) 710 and the base yarns 720 are integrally braided (i.e. interlaced) with each other, where the high performance yarns are braided to form the braided framework 780 forming a specific pattern that may be visually perceptible such as, for example, the crisscross pattern shown in FIGS. 7A and 7B. As shown more clearly, the pattern of the braided framework 780 may be different in different portions of the unitary braided upper 700. For example, the braided framework 780 forms a crisscross pattern only on the medial midfoot portion and the lateral midfoot portion 760 of the unitary braided upper 700, while at the underfoot portion, the braided framework 780 may form other patterns such as a pattern comprised of parallel lines extending across the underfoot portion 1210 shown in FIG. 5C. Further, as briefly described above, other patterns for the braided framework are contemplated. For example, the braided pattern may consist of a plurality of stacked auxetic hexagons, continuously linear, a plurality of stacked shapes in general such as, for example, logos, geometric shapes, organic shapes, and the like to provide visual appeal in addition to the stabilization and reinforcement provided by the high performance yarns. Further, because braiding is a low friction technique for producing textiles, yarns of different materials, weights, strands of materials, and the like may be used to form the braided framework 780 as an integral part of the braided upper 700. Further, as seen from the close-up view in FIG. 8, the braided framework may be comprised of one or more types of high performance yarns. In other words, high performance yarn 710 may be chosen according to the properties desired for the finalized braided article of footwear. Further, as described above, many different types of braided structures are available for imparting different types of properties to the overall braided article, and therefore, depending on the number of strands needed to form a particular braided structure, more or less different types of yarns may be added in the braided structure to maximize the physical properties of the braided structure and the physicochemical properties of the yarns used.

A Braided Article of Footwear with an Integrally Contiguously Braided Eyelets for Lacing.

Aspects in accordance herein are also directed to providing an article of footwear comprising integrally braided eyelets for lacing. The braided article of footwear may comprise a braided upper having a first braided layer, with a first surface and a second surface, formed from at least a high performance yarn and a base yarn. The first surface may define a toe portion, a heel portion opposite the toe portion, a medial midfoot portion and a lateral midfoot portion extending between the toe portion and the heel portion, and a throat portion between the medial midfoot portion and the lateral midfoot portion. The second surface may define an underfoot portion of the braided upper. The high performance yarns, as discussed above, may be integrally braided into the contiguously braided framework forming the braided upper of the braided article of footwear. The braided framework may further comprise a first plurality of arcuate braided loops forming a second braided layer along the first edge of the throat portion and a second plurality of arcuate braided loops also forming a second braided layer along the second edge of the throat portion, as shown in FIGS. 5A-6B. Alternatively, the arcuate loops may be formed by non-braided sections of the high performance yarn by allowing the high performance yarn(s) to exit from an interior surface (configured to face the last or a foot of a wearer when lasted or when worn by a wearer) of the braided framework and reenter the braided framework at an exterior surface (surface that is opposite to the interior surface) of the braided framework forming the article of footwear. For example, the arcuate loops may be formed by floating the high performance yarn, along the throat portion of the article of footwear. As shown in FIGS. 7A-8, the exit point(s) 703 of the high performance yarn 710 may be directly aligned with the re-entry point(s) 705 in the braided framework to form the plurality of eyelets. Alternatively, the exit point(s) and the re-entry point(s) may be offset from one another in the braided framework.

Referencing FIGS. 5A-6B, the first plurality of braided arcuate loops 1182 and the second plurality of braided arcuate loops 1184 may be contiguously braided with the braided framework 1180 while transitioning from the main braided layer 1101 to the second braided layer 1103 at a first exit location 1310, and from the second braided layer 1103 back to the main braided layer 1101 at a second entry location 1320. Therefore, the first plurality of braided arcuate loops 1182 and the second plurality of braided arcuate loops 1184 may also be formed from the high performance yarns, providing a braided framework 1180. Each of the braided arcuate loops 1330 in the first plurality of braided arcuate loops 1182 and the second plurality of braided arcuate loops 1184 may comprise an opening 1340 configured to receive at least one lace framework 1190. Fit of the braided upper 1100 may be adjusted by the lace framework 1190, which may be interlaced between the first plurality of braided arcuate loops 1182 and the second plurality of braided arcuate loops 1184 through each opening 1340 to further engage the medial midfoot portion 1220 and the lateral midfoot portion 1160 of the article of footwear and provide a wearer with the ability to tune-fit or adjust a fit of the article of footwear according to the wearer's preferences. For example, one wearer may prefer a snug fit, while another wearer may prefer a loose fit. The wearer with the snug fit preference may be given the option to further tighten the fit of the article of footwear by pulling the medial and lateral sides of the article of footwear together with the aid of the lace framework 1190. Since the laced first plurality of braided arcuate loops 1182 and the second plurality of braided arcuate loops 1184 are contiguously braided with the braided framework 1180, the adjustment with the lace framework 1190 may impact the fit circumferentially around the wearer's foot and not just the instep area of the wearer's foot when the article of footwear incorporating the braided upper 1100 is worn as intended by the wearer. This will become more apparent as described with reference to FIGS. 5A and 5B, below.

For example, FIGS. 5A and 5B show how the braided framework 1180 is contiguously braided, along the throat portion of the unitary braided upper 1100, with the first plurality of braided arcuate loops 1182 along a lateral edge 1132 of the throat portion 1130 and the second plurality of braided arcuate loops 1184 along a medial edge 1134 of the throat portion 1130. As seen clearly in FIG. 5A, the first plurality of braided arcuate loops 1182 and the second plurality of braided arcuate loops 1184 are braided independent from the main braided layer 1101 forming the unitary braided upper 1100. In other words, the first plurality of braided arcuate loops 1182 and the second plurality of braided arcuate loops 1184 are on a separate plane or second braided layer 1103. Each braided arcuate loop 1330 in the first and second plurality of braided arcuate loops 1182 and 1184 comprises an exit location 1310 (also referred to as the first location), as shown in FIG. 6B, and an entry location 1320 (also referred to as the second location). The braided arcuate loop 1330, for example, is contiguously braided with the main braided layer 1101 forming the braided upper 1100 and as part of the braided framework 1180 up to the lateral edge 1132, of the throat portion 1130 of the braided upper 1100. Once the braided framework 1180 reaches the lateral edge 1132, the braided framework 1180 continues to be braided separately/independently from the lateral edge 1132 starting at exit location 1310 for a predetermined length to form a second braided layer 1103 and then, the braided framework 1180 is reincorporated into the main braided layer 1101 of the braided upper 1100 and the braided framework 1180 starting at an entry location 1320. In other words, the first and second plurality of braided arcuate loops 1182 and 1184 briefly form a second braided layer at the lateral and medial edges 1132 and 1134 of the unitary braided upper 1100.

Alternatively, as shown in the example shown in FIGS. 7A-8 each of the first plurality of arcuate loops 782 and the second plurality of arcuate loops 784, may alternatively be formed by allowing the one or more high performance yarn 710 strand(s) to exit the braided framework 780 from an exit point 703 and re-enter the braided framework 280 at an entry point 705 to continue to be braided into the braided framework 780. The first plurality of arcuate loops 782 and 784 may therefore be located in a second layer 850, while the braided framework 780 may be located in a main layer 840.

The exit point 703 for each arcuate loop 830 may be located on an inner surface of the braided upper 730, the inner surface being configured to face a wearer when the braided upper 700 is part of an article of footwear worn as intended by a wearer. The entry point 705 may be located at an outer surface of the braided upper 700. As can be seen in the close-up view in FIG. 8, the exit point 703 and the entry point 705 may be offset from the lateral edge 732 and the medial edge 734 of the braided upper 700, respectively. Further, although the entry point 705 and the exit point 703 are shown to align with each other in FIG. 8, it is contemplated that the exit point 703 and the entry point 705 may also be offset from one another, depending on the braided pattern formed by the high performance yarn 710 in the braided upper 700. Each of the arcuate loops 830 in the first plurality of arcuate loops 782 and the second plurality of arcuate loops 784 may comprise an opening 810 configured to receive at least one lace framework 790. A fit of the braided upper 700 may be adjusted by the lace framework 790, which may be interlaced between the first plurality of arcuate loops 782 and the second plurality of arcuate loops 784 through each opening 810 to further engage the medial midfoot portion and the lateral midfoot portion of the article of footwear and provide a wearer the ability to tune-fit or adjust a fit of the shoe according to the wearer's preferences. For example, one wearer may prefer a snug fit, while another wearer may prefer a loose fit. The wearer with the snug fit preference may be given the option to further tighten the fit of the article of footwear by pulling the medial and lateral sides of the article of footwear together with the aid of the lace framework 790. Since the laced first plurality of arcuate loops 782 and the second plurality of arcuate loops 784 are contiguous with the high performance yarn 710 that is integrally braided in the braided framework 780, the adjustment with the lace framework 790 may also impact the fit circumferentially around the wearer's foot and not just the instep area of the wearer's foot.

Braided Article of Footwear with Stretch Zones.

Aspects described herein are directed to an article of footwear and methods of making the article of footwear. The article of footwear may comprise a braided upper having at least a toe portion, a heel portion opposite the toe portion, and a midfoot portion extending between the toe portion to the heel portion on both a lateral side and a medial side. The braided upper may further comprise a throat portion at the apex of the midfoot portion on both the medial and lateral sides. Additionally, the braided upper may comprise a collar portion proximate a collar and located adjacent the heel portion.

The braided upper may comprise a first zone and a second zone. The first zone and the second zone may have a particular braided density of stretch yarn and/or base yarn. In particular, the first zone may comprise a higher braided density of the stretch yarn than the base yarn. In addition, the second zone may comprise a higher braided density of the base yarn than the stretch yarn. Because the stretch yarn may be described as generally having a greater elastic quality than the base yarn, the first zone may have a greater elastic quality than the second zone. According to aspects herein, the first zone may be positioned at various portions of the braided upper, such as the throat portion and/or the collar portion to aid in the donning and doffing of the braided upper.

In one exemplary aspect, the braided upper may comprise a toe portion having a toe seam and a heel portion having a seamless braided structure. The braided upper may further comprise a throat portion and a collar located proximal to the heel portion. The toe portion and the heel portion may comprise the base yarn and the throat portion may comprise the stretch yarn. In one exemplary aspect, the heel portion may further comprise the stretch yarn, where the heel portion comprises a higher density of the base yarn than the stretch yarn to provide structural stability. According to aspects herein, the stretch yarn may be integrated into, or dissociated from, the braided upper at a multi-structural juncture proximate that is located proximate the throat portion.

Methods are also described for making the braided upper. Generally, the braided upper may be a unitary braided structure formed by interbraiding one or more structures that are independently and simultaneously braided. In particular, the first structure may comprise the stretch yarn and the second structure may comprise the base yarn. The first and second structures may be independently and simultaneously braided at first, but then interbraided at a multi-structural juncture to form one unitary braided upper. That is, while the first and second structures are simultaneously braided as separate structures during a braiding operation, the stretch yarn of the first structure may be interlaced with the base yarn of the second structure to form the multi-structural junction and, ultimately, one unitary braided structure. Conversely, the braiding operation may begin braiding the unitary braided structure by interlacing stretch yarn with the base yarn at first but then transition to braiding independent braided structures (e.g., the first and second structures) at the multi structural junction. The multi-structural juncture may occur in any portions of the braided upper, such as proximate the throat portion and/or the collar portion. Once the one or more structures are interbraided at the multi-structural juncture, the stretch yarn and the base yarn may then be used to form the first zone and the second zone of the braided upper, as described above. In one aspect, the second braided structure may form the toe portion of the braided upper. Additionally or alternatively, the first braided structure may be removed from the braided upper.

The configuration thus described has a number of functional advantages. As mentioned, one advantage gained by forming various portions of the braided upper (e.g., the throat portion and the collar) with the stretch yarn is to aid in the donning and doffing of the article of footwear. In addition, by zonally braiding the elastic yarn in specific portions of the braided upper, it will not disturb the inelastic quality offered by the base yarn in the second zone (e.g., structural rigidity in the midfoot portion and the heel portion). Another advantage is that, by interbraiding two or more independent braided structures, the elastic yarn may be introduced or integrated into the braided upper at a specific portion without disturbing the structural rigidity offered by the base yarn. For instance, the braided upper may comprise an elastic yarn that is introduced or integrated into the braided upper proximate the throat portion so as to not undermine the inelastic quality offered by the base yarn in the toe portion. Hence, aspects described herein may achieve the targeted introduction and removal of the stretch yarn at a specific portion of the braided upper without diminishing the inelastic quality offered by the base yarn. Aspects of the braided upper will become more apparent with reference to FIGS. 9-12, as described below.

Figure 9:
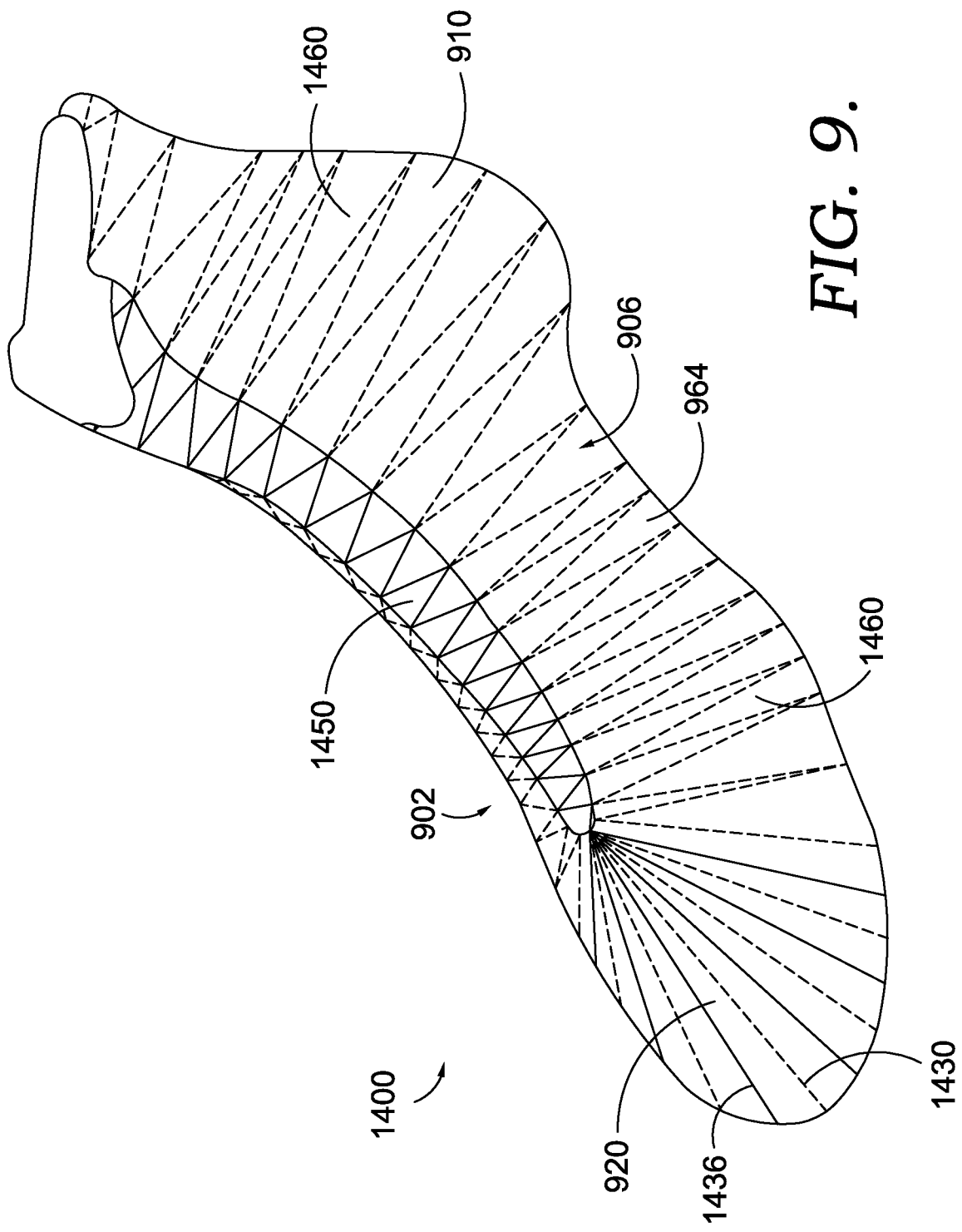
FIG. 9 depicts a perspective view of an exemplary braided upper in accordance with aspects herein.

Turning now to FIG. 9, a perspective view of an exemplary braided upper 1400 comprising the first zone 1450 and the second zone 1460 is provided in accordance with aspects herein. The braided upper 1400 of FIG. 9 may comprise the medial side 906 and the lateral side 902, where the lateral side 902 is opposite the medial side 906. The medial side 906 and the lateral side 902 may further be defined as having the toe portion 920, a heel portion 910 opposite the toe portion 920, and the midfoot portion 964 extending between the toe portion 920 and the heel portion 910. In addition, the braided upper 1400 may comprise the throat portion 904 at an apex of the midfoot portion 964 and extending between the toe portion 920 and heel portion 910. The braided upper 1400 may also comprise the collar portion 918 proximate the collar 914 and adjacent the heel portion 910.

In one aspect, the braided upper 1400 may comprise a first zone 1450 and a second zone 1460. The first zone 1450 and the second zone 1460 may be distinguished by the braided density of the stretch yarn 1436 and the base yarn 1430 within each of the zones. As used herein, the term stretch yarn generally refers to a yarn having a greater elastic quality than that of the base yarn. Exemplary stretch yarns comprise one or more synthetic or natural elastic yarns, fibers, or filaments such as Spandex, elastane, rubber, Lycra, and the like. Further, while the stretch yarn and the base yarn are referred to in the singular, it is contemplated that these zones may comprise a plurality of stretch yarns and/or a plurality of base yarns.

Because the braided upper 1400 may be one continuous braid structure, no edges separate the first zone 1450 and the second zone 1460. That is, the yarns of the first zone 1450 may be interlaced with the yarns of the second zone 1460 to form one continuous braided structure. As such, the braided upper 1400 may have the advantages of being a cohesive braided structure without the use of external coupling agents (adhesives, stitching, etc.) and may also be formed with less cutting, sewing, and finishing operations. As such, the braided upper may not suffer from the snapping or breaking of the external coupling agents.

As discussed, the first and second zones 1450, 1460 may have various braided densities of the stretch yarn 1436 and the base yarn 1430. The term braided density refers to the number and/or concentration of the particular yarn used in braiding the specific zones. In one aspect, the first zone 1440 may have a higher braided density of stretch yarn 1436 by having a higher concentration of the stretch yarn 1436 than the base yarn 1430. Alternatively or additionally, the first zone may have a higher braided density of stretch yarn 1436 by being braided with a greater number of stretch yarns than base yarns. Similarly, the second zone 1460 may have a higher braided density of the base yarn 1430 than the stretch yarn 1436 by braiding a greater number and/or higher concentration of the base yarn 1430 than the stretch yarn 1436. Accordingly, the first zone 1440 may have a greater elasticity than the second zone 1460.

Although the first and second zones 1450, 1460 are described as having various ratios of braided densities of both the stretch yarn 1436 and base yarn 1430, it is contemplated that the first zone 1450 may comprise the stretch yarn 1436 only and, accordingly, no base yarn 1430. Similarly, the second zone 1460 may comprise the base yarn 1430 only and, accordingly, no stretch yarn 1436. Any and all aspects of achieving a greater elasticity in the first zone when compared to the second zone are contemplated as being within the scope herein.

Continuing with reference to FIG. 9, based on how the braiding machine 10 is configured, the first and second zones 1450, 1460 may be placed at specific portions of the braided upper 1400. In aspects, the braided upper 1400 may be formed in one continuous braiding operation. As such, the braiding machine 10 may be configured to interlace the stretch yarn 1436 and the base yarn 1430 at specific braided densities so as to form the first and second zones 1450, 1460.

As can be seen in FIG. 14, the braided upper 1400 may comprise the first zone 1450 having a higher braided density of stretch yarn 1436 in at least the throat portion 904. In addition, the braided upper 1400 may comprise the second zone 1460 having a higher braided density of the base yarn 1430 in at least the midfoot portion 964 and the heel portion 910. Although not shown, it is contemplated herein that the first zone 1450 may alternatively and/or additionally be located in the collar portion 918.

Figure 10A:
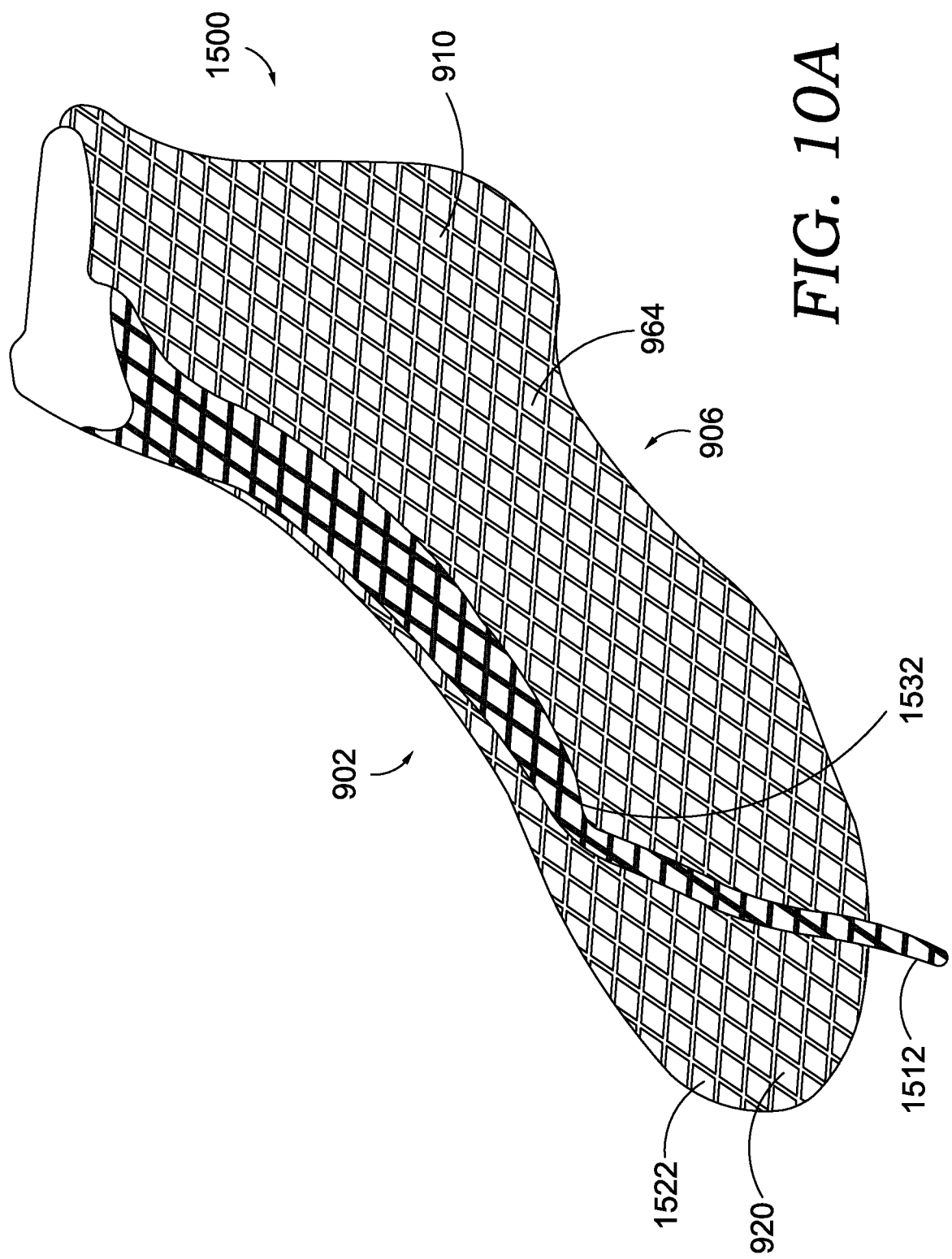
FIG. 10A depicts a perspective view of an exemplary braided upper in accordance with aspects herein.
Figure 10B:
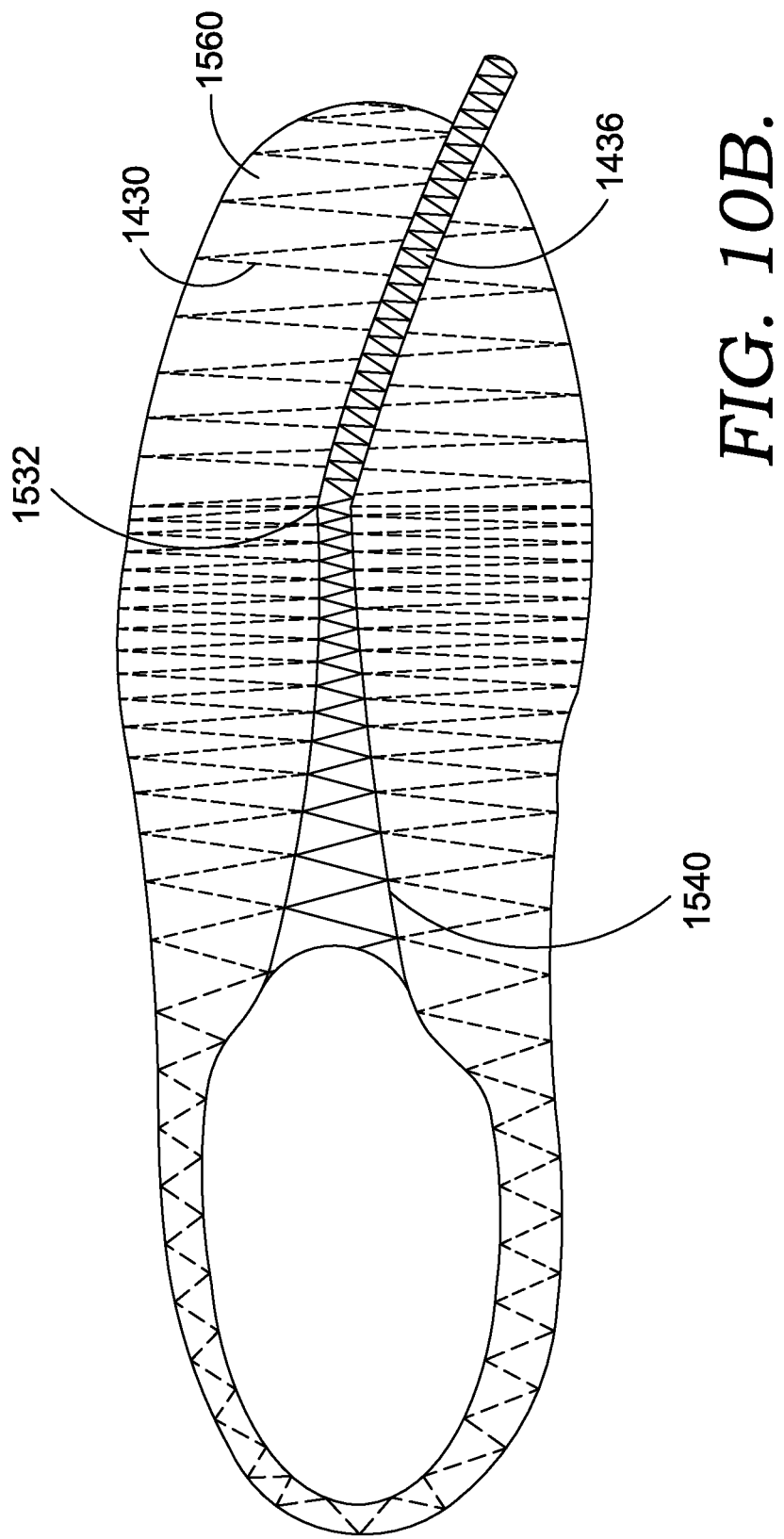
FIG. 10B depicts a top view of the exemplary braided upper in FIG. 10A in accordance with aspects herein.
Figure 10C:
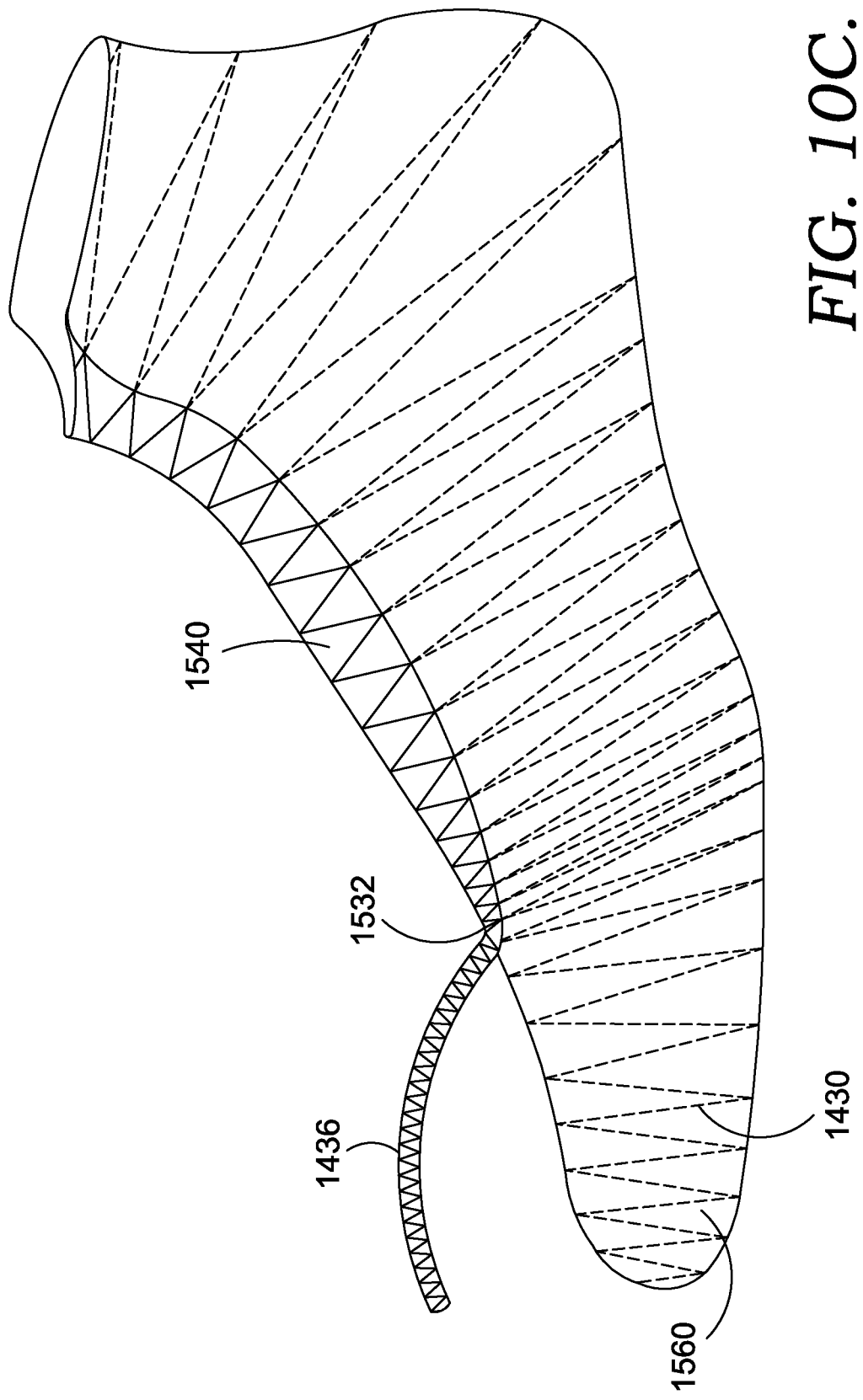
FIG. 10C depicts a side view of the exemplary braided upper in FIG. 10A in accordance with aspects herein.

Turning now to FIGS. 10A-C, a perspective view, a top view, and a medial side view of an exemplary braided upper 1500 comprising the first structure 1512 and the second structure 1522 is provided in accordance with aspects herein. The braided upper 1500 of FIGS. 10A-C may comprise the medial side 906 and the lateral side 902. In addition, the medial side 906 and the lateral side 902 may further be defined as having the toe portion 920, the heel portion 910 and the midfoot portion 964. Further, the braided upper 1500 may comprise the throat portion 904 and the collar portion 918.

With reference to FIG. 10A, the braided upper 1500 may comprise the first structure 1512 that was independently braided from the second structure 1522. The first braid structure 1512 may be braided with the stretch yarn 1436 while the second structure 1522 may be braided with the base yarn 1430. As shown, the contiguous braiding of the first structure 1512 and the second structure 1522 forms two independent structures that are attached at the multi-structural juncture 1532 to form one unitary braided upper. The term independently braided generally refers to the simultaneous braiding of two independent braid structures by one braiding machine during one braiding operation. Though described in more detail with reference to FIG. 11, the first structure 1512 may be independently braided with the second structure 1522 so as to form two independent braid structures that are merged and/or interbraided at the multi-structural juncture 1532. By independently braiding the first structure 1512 and the second structure 1522, the stretch yarn 1436 may be introduced into or dissociated from the braided upper 1500 at the multi-structural juncture 1532. It should be appreciated that the first structure 1512 may be removed proximate the multi-structural juncture 1532 so as to prevent the wearer from tripping. Accordingly, the remaining structure, i.e., the second structure 1522, may form the toe portion 920 of the braided upper 1500 without the stretch yarn 1436.

Referring to FIGS. 10A-C, the interbraiding of the first and second structures 1512, 1522 to form the multi-structural juncture 1532 is depicted in accordance with aspects herein. The interbraiding of the first and second structures 1512, 1522 may be achieved by interlacing the stretch yarn 1436 of the first structure 1522 with base yarn 1430 of the second structure 1512 during the braiding operation. As such, the multi-structural juncture 1532 may be located in any portion of the braided upper 1500, thereby allowing for the targeted introduction or integration of the stretch yarn 1436 into the braided upper 1500. In an exemplary aspect, the braided upper 1400 may be one unitary braided structure having the integration or disassociation of the stretch yarn 1436 proximate the throat portion 904. Accordingly, the base yarn 1430 of the second structure 1522 may form the second zone 1560 in the toe portion 920.

During the braiding of the unitary braided structure, the stretch yarn 1436 may be interlaced with the base yarn 1430 to form the first zone 1540 and/or the second 1560 in portions of the braided upper 1500. Thus, as discussed above with regard to the braided upper 1400 of FIG. 9, the throat portion 904 of the braided upper 1500 may comprise the first zone 1440 having a higher braided density of the stretch yarn 1436 than the base yarn 1430. In addition, the braided upper 1500 may comprise the second zone 1460 having a higher braided density of the base yarn 1430 than the stretch yarn 1436. Hence, the first zone 1540 may have a higher elastic quality in the throat portion 904 without diminishing the inelastic quality of the base yarn 1430 in the toe portion 920. In one aspect, the stretch yarn and/or base yarn may be introduced or exit the unitary braided structure at the multi-structural juncture 1532.

Although not shown, in an exemplary aspect, the braided upper 1500 may comprise one or more seams. For instance, the toe portion 920 may comprise a toe seam that may be closed using an external coupling agent (adhesives, stitching, etc.) to provide an enclosed toe. Because exemplary aspects of the braided upper 1500 are braided in one continuous braiding operation beginning at the toe portion 920, the heel portion 910 may have a seamless braided structure since the braiding machine may continuously braid one unitary braided structure. This provides at least one advantage, such as decreasing the time needed to enclose a heel seam or a toe seam using external coupling agents. Accordingly, in one aspect, the braided upper 1500 may comprise a toe portion 920 having a toe seam and a heel portion 910 having a seamless braided structure. Additionally or alternatively, the braided upper may comprise a toe portion 920 having a seamless braided structure and a heel portion 910 having a heel seam.

Figure 11:
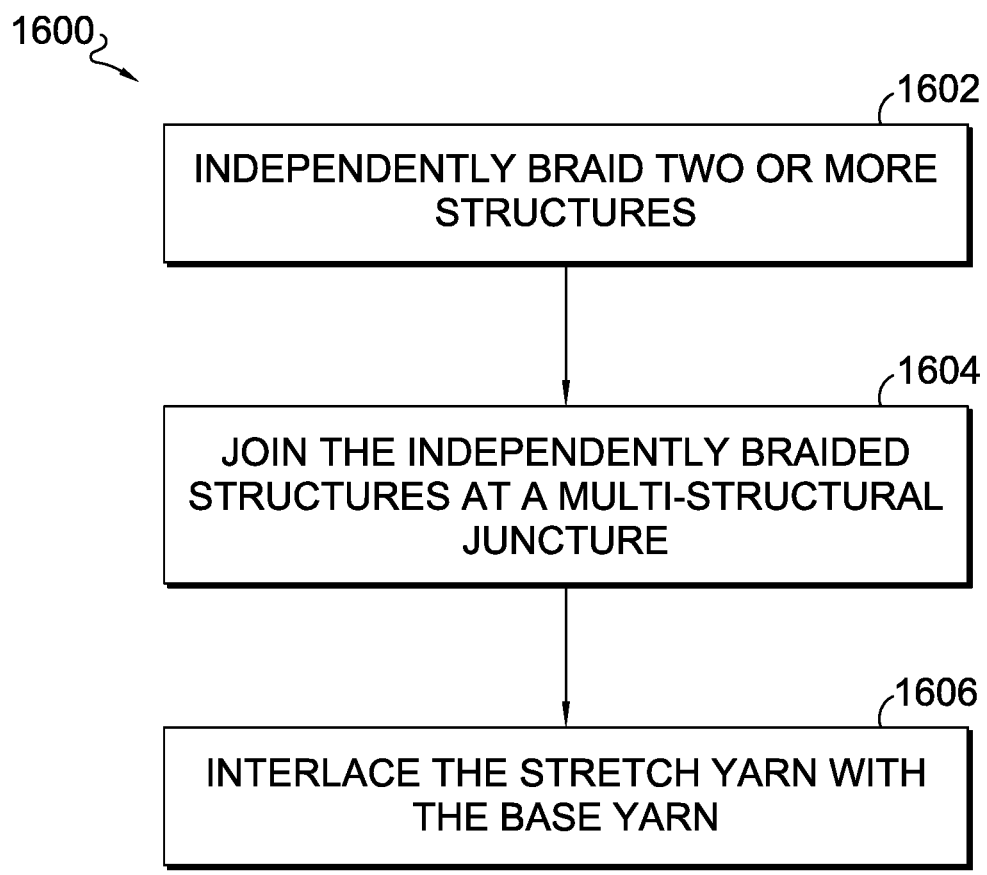
FIG. 11 depicts a method of making an exemplary braided upper in accordance with aspects herein.

Turning now to FIG. 11, a method 1600 of braiding an exemplary braided upper (such as the braided upper 1500 of FIGS. 10A-C) through the interbraiding of at least two independently braided structures is provided in accordance with aspects herein. For simplicity, steps 1602-1606 may be defined as occurring at various times during one continuous braiding operation. Specifically, step 1602 may be defined as occurring at $t_1$ during a braiding operation when the first structure 1512 is independently braided from the second structure 1522. Step 1602 may be defined as occurring at $t_2$ during a braiding operation when the first structure 1512 is interbraided with the second structure 1522, where $t_2$ occurs after $t_1$. Step 1602 may be defined as occurring at $t_3$ during a braiding operation when the stretch yarn 1436 is interlaced with the base yarn 1430 to form the first and second zones 1440, 1460, where $t_3$ occurs after $t_1$ and $t_2$. It is contemplated that $t_1$, $t_2$, and $t_3$ occur in different order. Any and all aspects, and combinations thereof, is contemplated as being within the scope herein.

At step 1602, the two or more structures (e.g., the first and second structures 1512, 1522) may be independently braided at $t_1$. The braiding machine 10 may be configured to independently braid the two or more structures as two separate braid structures. For instance, the braiding machine 10 may be configured to braid the first structure 1512 while simultaneously and independently braiding the second structure 1522. Further, step 1602 may further comprise independently braiding the two or more structures using distinct yarns. As mentioned, in one aspect, the first structure 1512 may be braided from the stretch yarn 1436 while the second structure 1522 may be braided from the base yarn 1430. As discussed with reference to FIGS. 10A-C, the contiguous braiding of the second structure 1522 may allow for the braiding of the toe portion 920 with the base yarn 1430 and without the stretch yarn 1436.

At step 1604, the braiding machine 10 may be configured to, at t2, interbraid the independently braided two or more structures at the multi-structural juncture 1532. The multi-structural juncture 1532 may be created by interlacing the yarns of the two or more structures, as discussed above with reference to FIGS. 10A-C. In addition, the multi-structural juncture 1532 may occur in any portion of the braided upper 1400. For instance, the braiding machine may be configured to form the multi-structural juncture 1532 proximate the throat portion 904. Hence, in aspects, step 1604 allows for the integration of the stretch yarn 1436 into one or more specific portions of the braided upper 1400 at various times during one continuous braiding process.

At step 1606, the braiding machine 10 may be configured to, at $t_3$, interlace the stretch yarn 1436 of the first structure 912 with the base yarn 1430 of the second structure 1422 throughout the remaining portions of braided upper 1400 to form the first zone 1440 and the second zone 1460. As mentioned, the first zone 1440 may comprise a higher braided density of the stretch yarn 1436 to the base yarn 1430. Additionally or alternatively, the second zone 1460 may comprise a higher braided density of the base yarn 1430 to the stretch yarn 1436.

Figure 12:
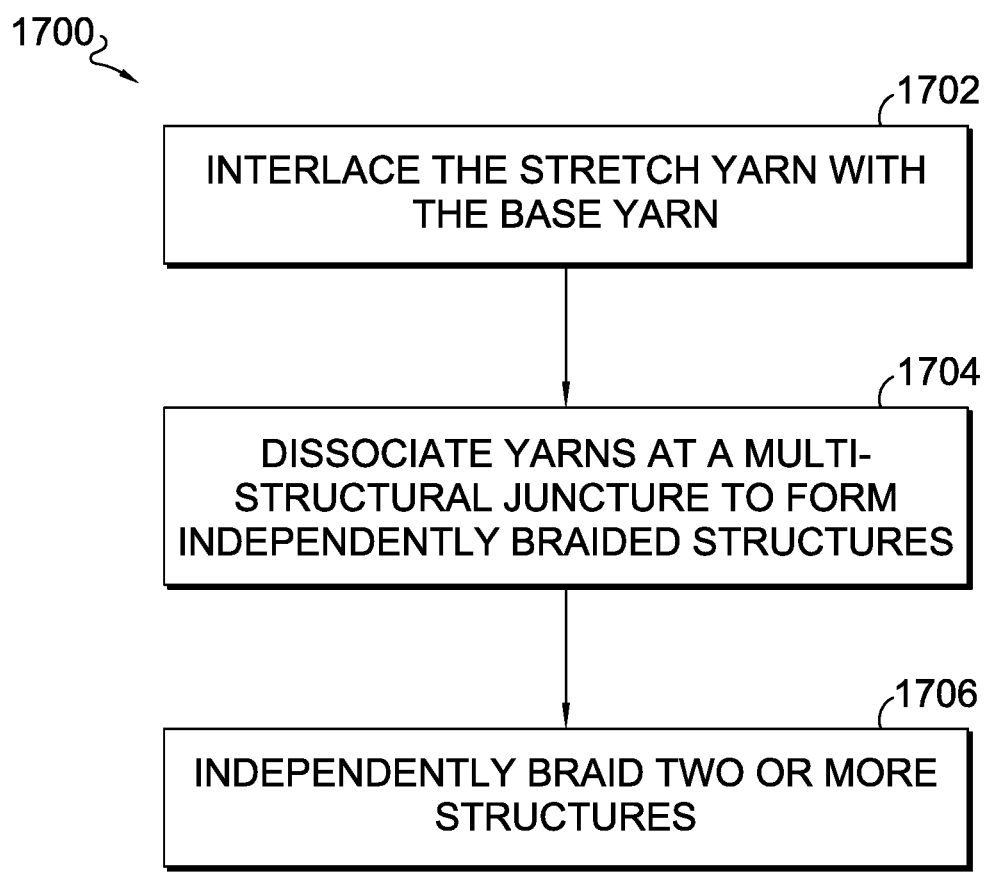
FIG. 12 depicts a method of making an exemplary braided upper in accordance with aspects herein.

Turning now to FIG. 12, a method 1700 of braiding an exemplary braided upper (such as the braided upper 1500 of FIGS. 10A-C) through the interbraiding of at least two independently braided structures is provided in accordance with aspects herein. For simplicity, steps 1702-1706 may be defined as occurring at various times during one continuous braiding operation. Specifically, step 1702 may be defined as occurring at $t_1$ during a braiding operation when the braiding machine 10 interlaces the stretch yarn 1436 with the base yarn 1430 through portions of braided upper 1400 to form the first zone 1440 and the second zone 1460. Step 1704 may be defined as occurring at t2 during a braiding operation when a multi-structural juncture 1532 is formed, where t2 occurs after t1. Step 1706 may be defined as occurring at t3 during a braiding operation when the first structure 1512 is independently braided from the second structure 1522, where t3 occurs after t1 and t2.

At step 1702, the braiding machine 10 may interlace the stretch yarn 1436 of the first structure 912 with the base yarn 1430 of the second structure 1422 throughout the portions of braided upper 1400 to form the first zone 1440 and the second zone 1460. As mentioned, the first zone 1440 may comprise a higher braided density of the stretch yarn 1436 to the base yarn 1430. Additionally or alternatively, the second zone 1460 may comprise a higher braided density of the base yarn 1430 to the stretch yarn 1436.

At step 1704, the braiding machine 10 may be configured to, at t2, form the multi-structural juncture 1532. The multi-structural juncture 1532 may be created by removing the stretch yarn 1436 and/or base yarn 1430. The yarns may then be used to form two or more structures, as discussed above with reference to FIGS. 10A-C. In addition, the multi-structural juncture 1532 may occur in any portion of the braided upper 1400. For instance, the braiding machine may be configured to form the multi-structural juncture 1532 proximate the throat portion 904. Hence, in aspects, step 1704 allows for the disassociation or exiting of the stretch yarn 1436 and/or base yarn 1430 from the braided upper 1400 at various times during one continuous braiding process.

At step 1602, the two or more structures (e.g., the first and second structures 1512, 1522) may be independently braided at $t_1$. The braiding machine 10 may be configured to independently braid the two or more structures as two separate braid structures. For instance, the braiding machine 10 may be configured to braid the first structure 1512 while simultaneously and independently braiding the second structure 1522. Further, step 1602 may further comprise independently braiding the two or more structures using distinct yarns. As mentioned, in one aspect, the first structure 1512 may be braided from the stretch yarn 1436 while the second structure 1522 may be braided from the base yarn 1430. As discussed with reference to FIGS. 10A-C, the contiguous braiding of the second structure 1522 may allow for the braiding of the toe portion 920 with the base yarn 1430 and without the stretch yarn 1436.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A braided article of footwear comprising:
    a sole; and
    a braided upper coupled to the sole, the braided upper
        having a first braided layer defining a toe portion, a heel portion, a medial midfoot portion and a lateral midfoot portion extending between the toe portion and the heel portion, a throat portion, and an underfoot portion,
    wherein the braided upper is comprised of a high performance yarn and a base yarn, wherein the high performance yarn forms a braided pattern that is integrally and contiguously braided with at least a portion of the first braided layer of the braided upper,
    wherein the high performance yarn comprises a higher tensile strength than the base yarn,
    wherein the braided pattern extends along at least the heel portion, the medial midfoot portion and/or the lateral midfoot portion on the braided upper,
    wherein the high performance yarn continuously extends from the braided pattern in the first braided layer and forms a first plurality of arcuate loops forming a second layer along a first edge of the throat portion and a second plurality of arcuate loops forming the second layer along a second edge of the throat portion,
    wherein the second layer is on a separate plane from the first braided layer;
    wherein each of the first plurality of arcuate loops and the second plurality of arcuate loops exits from a first location on an interior surface of the first braided layer and re-enters at a second location on an exterior surface of the first braided layer,
    wherein each arcuate loop of the first plurality of arcuate loops and the second plurality of arcuate loops comprises an opening configured to receive a lace framework, and
    wherein a braided framework formed by the braided pattern in the first braided layer, the first plurality of arcuate loops, and the second plurality of arcuate loops cooperates with the lace framework to circumferentially adjust a fit of the braided article of footwear around a wearer's foot when the braided article of footwear is worn by the wearer.

2. The braided article of footwear of claim 1, wherein the first plurality of arcuate loops and the second plurality of arcuate loops are continuously braided in the second layer.

3. The braided article of footwear of claim 1, wherein the high performance yarn comprises one or more of a thermoplastic coated polyester yarn, an aramid material yarn, a liquid crystal material yarn, a carbon fiber yarn, or a combination thereof.

4. The braided article of footwear of claim 1, wherein the base yarn comprises one or more of nylon, polyester, cotton, hemp, polyethylene, polypropylene, silk, bamboo, or a combination thereof.

5. The braided article of footwear of claim 1, wherein the first location and the second location are aligned with each other.

6. The braided article of footwear of claim 1, wherein the first location and the second location are offset from each other.

7. The braided article of footwear of claim 1, wherein the braided pattern comprises at least two linear segments that cross each other at least at one point.

8. The braided article of footwear of claim 1, wherein the braided pattern comprises at least two linear segments that are parallel to each other at the underfoot portion of the braided upper.

9. A braided article of footwear comprising:
a first braided layer forming a braided upper defined by at least a toe portion, a heel portion, a throat portion, a medial midfoot portion, and a lateral midfoot portion, wherein the first braided layer comprises a base yarn and a high performance yarn, wherein the high performance yarn comprises a higher tensile strength than the base yarn; and
one or more arcuate loops comprised of the high performance yarn that are continuous with a braided pattern formed by the high performance yarn in the first braided layer;
wherein the one or more arcuate loops are on a separate plane from the first braided layer,
wherein at each arcuate loop of the one or more arcuate loops, the high performance yarn exits the first braided layer from an interior surface of the first braided layer and re-enters the first braided layer at an exterior surface of the first braided layer,
wherein the each arcuate loop in the one or more arcuate loops encloses an opening configured to receive a lace framework, and
wherein the high performance yarn forming the braided pattern and the one or more arcuate loops cooperates with the lace framework to circumferentially adjust a fit of the braided article of footwear around a wearer's foot when the braided article of footwear is worn by the wearer.

10. The braided article of footwear of claim 9, wherein the high performance yarn is comprised of a thermoplastic coated polyester yarn.

11. The braided article of footwear of claim 10, wherein a thermoplastic material coating the thermoplastic coated polyester yarn comprises thermoplastic polyurethane (TPU).

12. The braided article of footwear of claim 9, wherein the one or more arcuate loops are continuously braided.

13. The braided article of footwear of claim 9, wherein the braided pattern comprises at least two linear segments that cross each other at least at one point.

14. The braided article of footwear of claim 9, wherein the braided pattern comprises at least two linear segments that are parallel to each other at an underfoot portion of the braided upper.

15. A method of forming a braided article of footwear, the method comprising:
interlacing a plurality of base yarns and a plurality of high performance yarns in at least two different directions to form a first braided layer and a second layer, wherein the plurality of high performance yarns form a braided pattern in the first braided layer and continuously form a plurality of arcuate loops in the second layer, wherein the plurality of arcuate loops in the second layer continuously extend from the braided pattern in the first braided layer, wherein the first braided layer is in a separate plane from the second layer, and wherein the plurality of high performance yarns have a higher tensile strength than the plurality of base yarns;
forming a braided upper from the first braided layer and the second layer, the braided upper having a toe portion, a heel portion, a medial midfoot portion and a lateral midfoot portion between the toe portion and the heel portion, a throat portion between the medial midfoot portion and the lateral midfoot portion, and an underfoot portion wherein the braided pattern extends at least along the medial midfoot portion, the lateral midfoot portion, the heel portion and the underfoot portion, wherein the plurality of arcuate loops extend along the throat portion of the braided upper, each loop in the plurality of arcuate loops having an exit point located at an interior surface of the braided upper and an entry point located at an exterior surface of the braided upper, wherein each arcuate loop in the plurality of arcuate loops comprises an opening configured to receive a lace framework, wherein the braided pattern and the plurality of arcuate loops formed by the plurality of high performance yarns cooperate with the lace framework to circumferentially adjust a fit of the braided upper around a wearer's foot when the braided article of footwear is worn by the wearer; and
affixing a sole to the underfoot portion of the braided upper.

16. The method of claim 15, wherein the plurality of arcuate loops in the second layer are formed by floating one or more of the plurality of high performance yarns.

17. The method of claim 15, wherein the plurality of high performance yarns comprise one or more of a thermoplastic coated polyester yarn, an aramid material yarn, a liquid crystal material yarn, a carbon fiber yarn, or a combination thereof.

18. The method of claim 15, wherein the plurality of base yarns comprise one or more of nylon, polyester, cotton, hemp, polyethylene, polypropylene, silk, bamboo, or a combination thereof.

* * * * *

UNITED STATES PATENT AND TRADEMARK OFFICE
CERTIFICATE OF CORRECTION

| | | |
|---|---|---|
| PATENT NO. | : 11,202,483 B2 | |
| APPLICATION NO. | : 15/993190 | |
| DATED | : December 21, 2021 | |
| INVENTOR(S) | : Robert M. Bruce et al. | |

It is certified that error appears in the above-identified patent and that said Letters Patent is hereby corrected as shown below:

In the Specification

- Column 7 Line 32: Delete "FIG. 7A-B," and insert -- FIGS. 7A-B, --
- Column 8 Line 15-16: Delete "Integrally Contiguously" and insert -- Integrally and Contiguously --
- Column 8 Line 46: Delete "yarn, along" and insert -- yarn along --
- Column 15 Line 61-63: Delete "At step 1602, the two or more structures (e.g., the first and second structures 1512, 1522) may be independently braided at t1" and insert -- At step 1706, based on forming the multi-structural juncture 1532, the first structure 1512 can be independently braided from the second structure 1522 --
- Column 16 Line 1: Delete "1602" and insert -- 1706 --

Signed and Sealed this
Tenth Day of May, 2022

Katherine Kelly Vidal
*Director of the United States Patent and Trademark Office*